US008383925B2

(12) United States Patent
Uehara et al.

(10) Patent No.: US 8,383,925 B2
(45) Date of Patent: Feb. 26, 2013

(54) SOUND COLLECTOR, SOUND SIGNAL TRANSMITTER AND MUSIC PERFORMANCE SYSTEM FOR REMOTE PLAYERS

(75) Inventors: Haruki Uehara, Hamamatsu (JP); Kenji Matahira, Iwata (JP)

(73) Assignee: Yamaha Corporation, Shizuoka-Ken (JP)

( * ) Notice: Subject to any disclaimer, the term of this patent is extended or adjusted under 35 U.S.C. 154(b) by 1051 days.

(21) Appl. No.: 11/940,708

(22) Filed: Nov. 15, 2007

(65) Prior Publication Data

US 2008/0163747 A1 Jul. 10, 2008

(30) Foreign Application Priority Data

Jan. 10, 2007 (JP) ................................ 2007-002361

(51) Int. Cl.
*G10H 5/00* (2006.01)
*H04Q 1/18* (2006.01)

(52) U.S. Cl. .......................... 84/653; 381/94.1; 381/151

(58) Field of Classification Search .................. 381/151, 381/94.1–94.9

See application file for complete search history.

(56) References Cited

U.S. PATENT DOCUMENTS

| | | | | |
|---|---|---|---|---|
| 5,933,506 | A * | 8/1999 | Aoki et al. | 381/151 |
| 6,278,048 | B1 | 8/2001 | Lee | |
| 6,653,545 | B2 * | 11/2003 | Redmann et al. | 84/615 |
| 6,911,592 | B1 | 6/2005 | Futamase et al. | |
| 7,129,408 | B2 * | 10/2006 | Uehara | 84/645 |
| 7,288,712 | B2 | 10/2007 | Uehara | |
| 7,297,858 | B2 * | 11/2007 | Paepcke | 84/609 |
| 7,820,902 | B2 * | 10/2010 | Furukawa et al. | 84/609 |
| 7,853,342 | B2 * | 12/2010 | Redmann | 700/94 |
| 2005/0056141 | A1 * | 3/2005 | Uehara | 84/645 |
| 2005/0150362 | A1 | 7/2005 | Uehara | |
| 2006/0079291 | A1 | 4/2006 | Granovetter et al. | |
| 2006/0293887 | A1 | 12/2006 | Zhang et al. | |
| 2008/0163747 | A1 * | 7/2008 | Uehara et al. | 84/645 |
| 2008/0279366 | A1 * | 11/2008 | Lindbergh | 379/421 |
| 2009/0149722 | A1 * | 6/2009 | Abolfathi et al. | 600/301 |

FOREIGN PATENT DOCUMENTS

| | | |
|---|---|---|
| JP | 2002-358089 | 12/2002 |
| JP | 2005-84578 A | 3/2005 |
| JP | 2005-196072 A | 7/2005 |
| JP | 2005-196074 | 7/2005 |
| JP | 2005-196074 A | 7/2005 |
| WO | 2005/031697 | 4/2005 |

* cited by examiner

*Primary Examiner* — Jeffrey Donels
(74) *Attorney, Agent, or Firm* — Harness, Dickey & Pierce, PLC

(57) ABSTRACT

A music station is connected through a communication network to another music station, and pieces of music data expressing an exhibition performance on a automatic player piano and pieces of voice data expressing tutor's explanation are transmitted from the music station to the other music station through different communication channels; and a close-talking microphone and a bone conduction microphone are incorporated in a sound collector on the music station, and a vibration signal from the bone conduction microphone is examined to see whether or not the cord of tutor vibrates; when the answer is given affirmative, a voice signal from the close-talking microphone is relayed to a transmitter module so that the sound collector does not permit the transmitter module to transmit the voice signal expressing noises such as the tones; whereby the music performance system prevents the trainee from tones reproduced from a headphone.

5 Claims, 13 Drawing Sheets

SOUND COLLECTOR, SOUND SIGNAL TRANSMITTER AND MUSIC PERFORMANCE SYSTEM FOR REMOTE PLAYERS

FIELD OF THE INVENTION

This invention relates to a sound collector, a sound signal transmitter and a music performance system and, more particularly, to a sound collector converting sound from a target source into an electric signal, a sound signal transmitter equipped with the sound collector, a music performance system having plural music stations communicable through a communication network.

DESCRIPTION OF THE RELATED ART

Music lessons are in demand. A tutor gives remote lessons to trainees, who are remote from the tutor, where communication technologies make it possible to give the remote lessons in real time fashion. Although the tutor is far from the trainees, the trainees can hear the tutor's performance and instructions through the communication network such as, for example, the internet or a LAN (Local Area Network). The communication technologies further make it possible to perform a piece of music in ensemble by players who are remoter from each other. A music performance system is thus prepared for the remote lessons, remote ensemble and the like.

The music performance system includes plural musical instruments, a transmitter, a receiver and a communication network. Typical examples of such a music performance system are disclosed in Japan Patent Application laid-open No. 2005-196072, Japan Patent Application laid-open No. 2005-196074 and Japan Patent Application laid-open No. 2005-084578.

Each of the prior art music performance systems includes plural music stations and a network connected to the plural music stations. One of the music stations is assigned to a tutor. A musical instrument, a microphone, a voice signal generator, a sound system and a transmitter and receiver are provided on that music station. A trainee occupies the other music station. A musical instrument, a microphone, a voice signal generator, a sound system and a transmitter and receiver are provided on the other music station, as well. A keyboard, a MIDI (Musical Instrument Digital Interface) code generator and an automatic player are incorporated into each of the musical instruments, and the transmitter and receiver on the music station are connected via a channel of the communication network to the transmitter and receiver on the other music station.

The remote lesson is carried out as follows. First, the communication channel is established in the communication network between the music stations. The tutor fingers a music passage on the keyboard, and explains how to play the music passage. The tones comprising the music passage are converted to MIDI event codes, which express the key codes of the depressed keys, key codes of the released keys, key velocity and a lapse of time between each key event and the next key event, through the MIDI code generator, and The MIDI event codes are transferred as payloads of packets from the transmitter on tutor's music station to the receiver on trainee's music station through the communication channel. The MIDI event codes are supplied from the receiver to the automatic player, and the automatic player depresses and releases the keys of the keyboard on the basis of the MIDI event codes. The tones are played back by the musical instrument so that the trainee can hear the music passage.

Meanwhile, the tutor's voice is converted to a voice signal by the microphone, and is transmitted from tutor's music station to trainee's music station through the communication channel. The voice signal is restored, and the trainee hears the tutor's voice through the sound system.

While the trainee is fingering the music passage on the keyboard, the automatic player reproduces the fingering on the keyboard on tutor's station, and trainee's questions are heard on tutor's music station. Thus, the MIDI event codes and voice messages are bi-directionally transferred between the music stations during the remote lessons.

A problem with the prior art music performance system is that the tones reproduced through the sound system, sound noisy to the trainee. This is because the tutor keeps the microphone in the on-state while giving the lesson. Thus the microphone captures not only the tutor's voice but also the tones produced by the musical instrument as the "voice signal." Even when the tutor does not speak, the tones from the tutor's instrument are captured as part of the voice signal, and sent from the tutor station to the trainee station through the communication channel. Meanwhile, the MIDI event codes sent from the tutor's instrument are restored and supplied to the trainee's automatic playing system. Thus, the voice signal, which has captured the tones of the tutor's instrument, are supplied to the sound system and played back through the speakers of the sound system. As a result, the trainee hears the electric tones concurrently with the acoustic tones produced through the automatic playing. This unavoidably introduces small amount of time delay between the electric tones and the acoustic tones so that the overall result sounds noisy to the trainee.

SUMMARY OF THE INVENTION

It is therefore an important object of the present invention to provide a sound collector, which is enabled during sound are generated at a target source.

It is also important object of the present invention to provide a sound signal transmitter, which makes it possible to transmit a sound signal output from the sound collector.

It is another important object of the present invention to provide a music performance system, through which players, who are remote from each other, have a conversation and or gives a lecturer together with a performance on musical instruments.

To accomplish the object of the present invention, it is proposed to provide plural microphones that sense different vibration propagation mediums whereby a sound signal propagation path is captured by one of the plural microphones and a vibration signal is captured by another of the microphones.

In accordance with one aspect of the present invention, there is provided a sound collector for outputting a sound signal expressing sound waves propagated from a source of sound through the air comprising:

a vibration detector coupled to a vibration propagating medium proximate the source of sound (the source of sound being different in vibration propagating property from that of the air) and converting vibrations of the vibration propagating medium to a vibration signal, a microphone converting the sound waves propagated through the air to the sound signal, and a signal propagation controller connected to the vibration detector so as to see whether the vibration signal expresses the vibrations of the sound source or noises, permitting the sound signal to pass therethrough when the vibration signal expresses the vibrations of the sound source and interrupting the sound signal when the vibration signal expresses the noises.

In accordance with another aspect of the present invention, there is provided a sound signal transmitter for transmitting a sound signal to a destination through a communication channel comprising a sound collector including:

a vibration detector attached to a vibration propagating medium proximate a source of sound different in vibration propagating property from the air and converting vibrations of the vibration propagating medium to a vibration signal, a microphone converting the sound waves propagated from the source of sound through the air to the sound signal and a signal propagation controller connected to the vibration detector so as to see whether the vibration signal expresses the vibrations of the source of sound or noises, permitting the sound signal to pass therethrough when the vibration signal expresses the vibrations of the source of sound and interrupting the sound signal when the vibration signal expresses the noises, and a transmitter connected to the signal propagation controller for transmitting the sound signal through the communication channel to the destination.

In accordance with yet another aspect of the present invention, there is provided a music performance system for a music performance comprising a communication channel for propagating pieces of music data and pieces of sound data therethrough, a music station connected to the communication channel and including a musical instrument having plural manipulators for specifying tones to be produced and producing pieces of music data expressing the tones, a control module connected to the musical instrument and delivering the pieces of music data to the communication channel and a sound signal transmitter connected to the communication channel and including a sound collector having a vibration detector attached to a vibration propagating medium around a source of sound different in vibration propagating property from the air and converting vibrations of the vibration propagating medium to a vibration signal, a microphone converting the sound waves propagated from the source of sound through the air to a sound signal and a signal propagation controller connected to the vibration detector so as to see whether the vibration signal expresses the vibrations of the source of sound or noises, permitting the sound signal to pass therethrough when the vibration signal expresses the vibrations of the source of sound and interrupting the sound signal when the vibration signal expresses the noises and a transmitter connected to the signal propagation controller for transmitting pieces of sound data represented by the sound signal through the communication channel, and another music station connected to the communication channel, and including another musical instrument having a tone generating capability without any fingering of a human player, another control module receiving the pieces of music data from the communication channel and timely supplying the pieces of music data to the aforesaid another musical instrument so as to cause the aforesaid another musical instrument to produce the tones on the basis of the pieces of music data and a sound signal receiver receiving the pieces of sound data from the communication channel and producing sound on the basis of the pieces of sound data.

BRIEF DESCRIPTION OF THE DRAWINGS

The features and advantages of the sound collector, sound signal transmitter and music performance system will be more clearly understood from the following description taken in conjunction with the accompanying drawings, in which.

DESCRIPTION OF THE PREFERRED EMBODIMENTS

Figure 1:
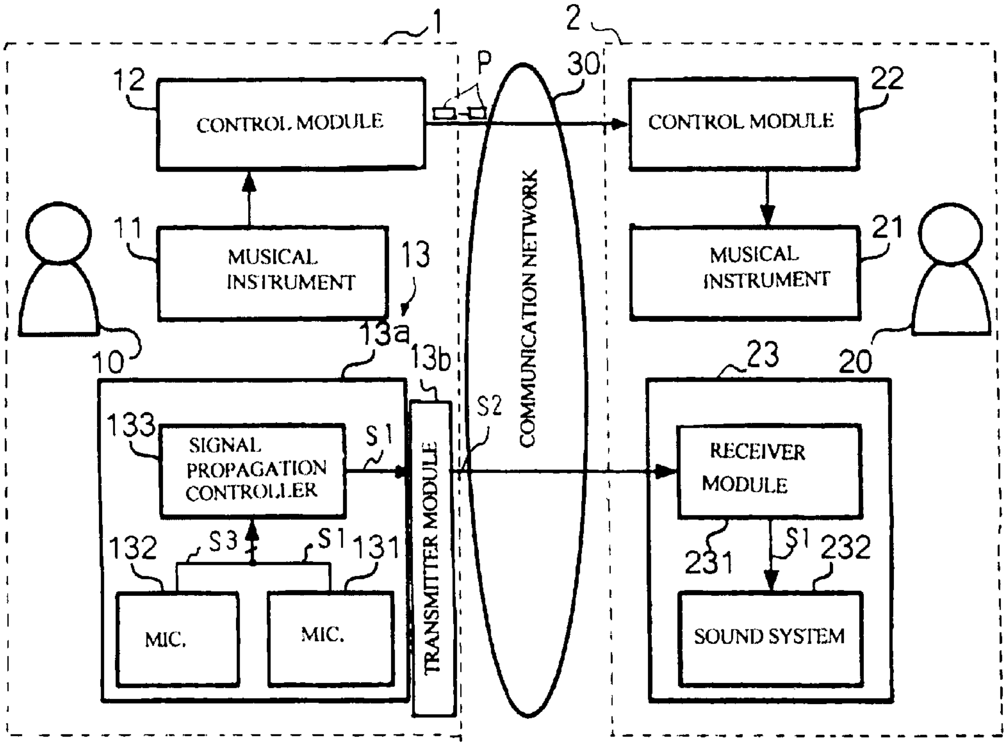
FIG. 1 is a block diagram showing a music performance system of the present invention for a remote lesson.

A music performance system embodying the present invention largely comprises a first music station, another music station and a communication channel. The first music station is occupied by a tutor, and the other music station is occupied by a trainee. The first music station and other music station are connected to the communication channel, and pieces of music data and pieces of sound data are transmitted from the music station to the other music station through the communication channel. The pieces of music data express the tones of the music tune or exhibition performance being taught, and the pieces of sound data convey the voice explanation of how to play the music tune or exhibition performance. Thus, the music performance system is used for a remote lesson.

The music station includes a musical instrument, a control module and a sound signal transmitter. The musical instrument has plural manipulators so that the tutor specifies the tones to be produced by means of the plural manipulators. In the exhibition performance, the tutor timely manipulates the manipulators according to the music tune. The control module monitors the plural manipulators, and produces pieces of music data expressing the tones produced in the exhibition performance. The control module delivers the pieces of music data through the communication channel to the other music station.

The sound signal transmitter is also connected to the communication channel to transmit the pieces of sound data expressing the explanation through the communication channel to the other music station.

The sound signal transmitter includes a sound collector and a transmitter module. The sound collector converts sound waves propagated thereto through the air to a sound signal. Although the sound collector supplies the sound signal expressing tutor's voice to the transmitter module, the sound collector interrupts the sound signal expressing noises so that the sound signal expressing the noises does not reach the transmitter module. This feature is desirable, because the tones are not reproduced at the other music station on the basis of the pieces of sound data.

In detail, the sound collector has a vibration detector, a microphone and a signal propagation controller. The detector and microphone are connected in parallel to a control node and a signal input node of the signal propagation controller, and an output node of the signal propagation controller is connected to the transmitter module.

The detector is attached to a vibration propagating medium around a source of sound. The source of sound is the vocal cords of tutor, and the bones and cutis (skin) of the tutor serve as the vibration propagating medium. The bones and cutis are different in vibration propagating property from that of the air. The detector converts vibrations of the vibration propagating medium to a vibration signal. The vibration signal expresses the vibrations of the vocal cords as well as any noises produced by manipulation of the musical instrument, such as movements at the articulates and vibrations of tympanum.

The microphone converts the sound waves propagated from the source of sound through the air to a sound signal. The voice is propagated from the vocal chords through the air to the microphone. The tones are also propagated from the musical instrument through the air to the microphone. Thus, the sound signal expresses the voice, tones and environmental noises.

The signal propagation controller examines the vibration signal to see whether the detector converts the vibrations of the vocal cords to the vibration signal. When the vibration signal expresses the vibrations of the sound source, i.e., vocal cords, the signal propagation controller permits the sound signal to pass therethrough so that the sound signal reaches the transmitter module. On the other hand, when the vibration signal expresses the noises and tones, the signal propagation controller interrupts the sound signal so that the sound signal reaches the transmitter module. Thus, the pieces of sound data are transmitted from the transmitter module through the communication channel to the other music station.

The other music station includes another control module, another musical instrument and a sound signal receiver. The musical instrument on the other music station has a tone generating capability without any fingering of a human player. The pieces of music data arrive at the other control module, and are timely supplied to the other music station so that the tones produced through the other musical instrument are similar to those in the exhibition performance.

The pieces of sound data arrive at the sound signal receiver. The sound is produced through the sound signal receiver. As described hereinbefore, the pieces of sound data expressing the tones are not transmitted to the other music station so that only the voice is reproduced. In other words, when the tutor does not speak, any tones captured by the microphone are not reproduced through the sound signal receiver. As a result, the trainee can concentrate on the tones produced through the musical instrument at his or her music station. Thus, the music performance system of the present invention prevents the trainee from the noisy tones reproduced through the sound signal receiver.

System Configuration

Referring first to FIG. 1 of the drawings, a music performance system embodying the present invention largely comprises a music station 1 for a tutor 10, another music station 2 for a trainee 20 and a communication network 30. The music stations 1 and 2 are connected to the communication network 30 so that the music station 1 is communicable with the music station 2 through communication channels established in the communication network 30 for the music stations 1 and 2. In this instance, the internet serves as the communication network 30.

The tutor 10 occupies the music station 1, and gives an exhibition performance and a lecture to the trainee 20. While the tutor 10 is playing a music tune as the exhibition performance, the fingering is converted to pieces of music data, and the pieces of music data are transmitted from the music station 1 to the music station 2 through the communication channel in the communication network 30. On the other hand, while the tutor 10 is explaining how to finger the music tune, the tutor's voice is converted to pieces of voice data, and the pieces of voice data are also transmitted from the music station 1 to the music station 2.

The trainee 20 occupies the music station 2. The exhibition performance is reproduced in the music station 2 on the basis of the pieces of music data, and the pieces of voice data are converted to electric voice so as to make it possible to hear the explanation.

As will be described hereinafter in detail, while the tutor 10 remains silent, any piece of voice data is neither produced nor transmitted from the music station 1 to the music station 2. For this reason, the tones in the exhibition performance are not converted to any piece of voice data.

A musical instrument 11, a control module 12 and a sound signal transmitter 13 are incorporated in the music station 1, and a musical instrument 21, a control module 22 and a sound signal receiver 23 are incorporated in the other music station 2. The musical instrument 11 has a data generating capability so that a performance on the musical instrument 11 is stored in a set of pieces of music data. The musical instrument 11 is connected to the control module 12 through a cable so that the pieces of music data are supplied from the musical instrument 11 to the control module 12. The control module 12 adds pieces of synchronous data to the pieces of music data, and the pieces of music data are packed in packets P together with the pieces of synchronous data. The control module 12 is connected to the communication network 30, and puts the packets P on the communication channel.

The communication network 30 is further connected to the control module 22 so that the packets P arrive at the control module 22. The musical instrument 21 has an automatic playing capability. The pieces of music data and pieces of synchronous data are unloaded from the packets P in the control module 22, and the control module 22 periodically checks the pieces of synchronous data to see whether a tone or tones are to be reproduced through the musical instrument 21. When the time to reproduce the tone or tones comes, the piece or pieces of music data are supplied from the control module 22 to the musical instrument 21, and the tone or tones are reproduced through the musical instrument 21. The control module 22 sequentially supplies the pieces of music data to the musical instrument 21 as described hereinbefore so that the exhibition performance is reproduced through the musical instrument 21. Thus, even though the trainee 20 is remote from the tutor 10, the tutor 10 gives the exhibition performance to the trainee 20 through the music performance system of the present invention.

The sound signal transmitter 13 includes a sound collector 13*a* and a transmitter module 13*b*. Although the voice of tutor 10 is always converted to a voice signal S1, the sound collector 13*a* supplies the voice signal S1 to the transmitter module 13*b* during the voice production of tutor 10, and stops the voice signal S1 in the silence. For this reason, while the tutor 10 is giving the exhibition performance to the trainee 20 without any word, the voice signal S1, which represents the tones produced through the musical instrument 11, is not put on the communication channel. On the other hand, while the tutor 10 is explaining how to finger the music tune, the voice is converted to the voice signal S1, and the voice signal S1 is supplied to the transmitter module 13*b*. The transmitter module 13*b* converts the analog voice signal S1 to a digital sound signal S2, and outputs the digital sound signal S2, on which the pieces of voice data ride, onto the communication channel.

The sound signal receiver 23 includes a receiver module 231 and a sound system 232. The communication channel is connected to the receiver module 231 so that the digital sound signal S2 arrives at the receiver module 231. The receiver module 231 reproduces the analog voice signal S1 from the digital sound signal S2, and the analog voice signal S1 is supplied from the receiver module 231 to the sound system 232. The sound system 232 has an amplifier, a loudspeakers and a headphone speaker. The analog voice signal S1 is converted to electric sound corresponding to the tutor's voice through the sound system 232. The trainee 20 hears the tutor's voice through the loudspeakers and/or headphone speaker.

The sound collector 13*a* includes a close-talking microphone 131, a bone conduction microphone 132 and a signal propagation controller 133. The close-talking microphone 131 and bone conduction microphone 132 are connected in parallel to the signal propagation controller 133.

Figure 2:
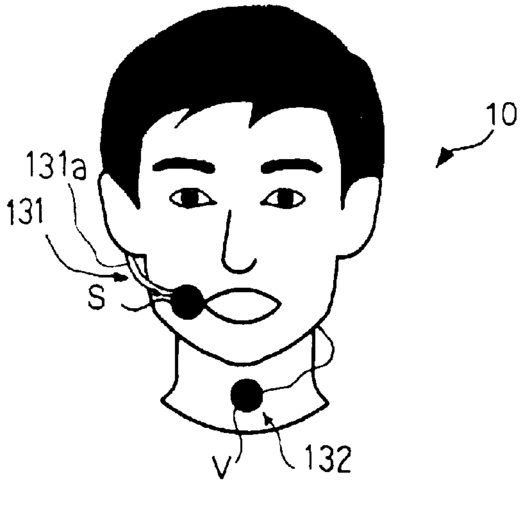
FIG. 2 is a front view showing a tutor, who puts a close-taking microphone and a bone conduction detector on the head for the remote lesson.
Figure 3:
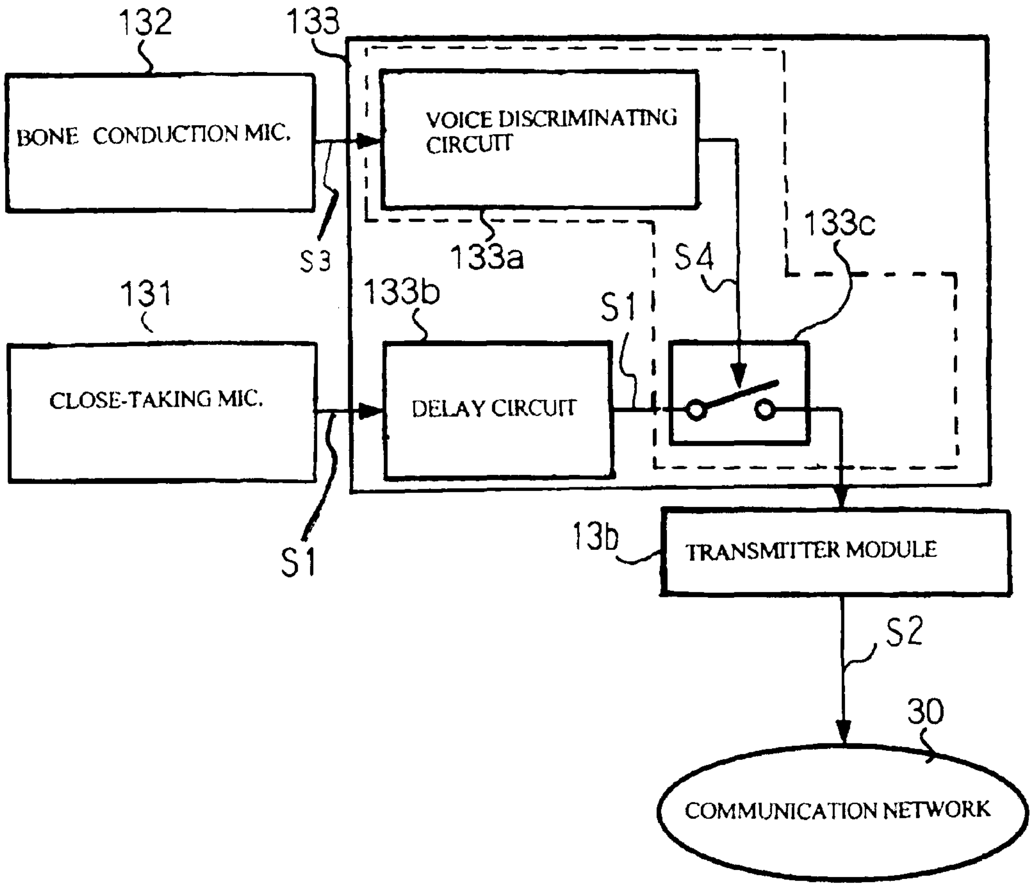
FIG. 3 is a block diagram showing a sound signal transmitter equipped with the close-talking microphone and bone conduction detector.

An ear clip 131*a* keeps the close-talking microphone 131 in the vicinity S of the mouth of the tutor 10 as shown in FIG. 2, and the close-talking microphone 131 exhibits high sensitivity to the voice through the mouth of the tutor 10. The close-talking microphone 131 is optimized in directivity, frequency characteristics and sensitivity to the pick-up of voice at S. The close-talking microphone 131 converts the sound waves, which are propagated from the vocal cords through the air, to the voice signal S1. Although the close-talking microphone 131 is sensitive to the sound waves through the mouth, sound waves expressing various noises are also propagated through the air to the close-talking microphone 131, and the noise components are mixed in the voice signal S1. While the tutor 10 is given the exhibition performance, the sound waves expressing the tones reach the close-talking microphone 131, and are mixed in the voice signal S1 as the noise component.

The bone conduction microphone 132 is held in contact with the cutis of the tutor 10 by means of a piece of adhesive compound or a neckband, and is kept in area V close to the vocal cords. The vibrations of vocal cords are propagated through the cutis, as are vibrations propagated through the tibia and these are converted to a vibration signal S3. Although noises due to movements at articulates are unavoidably mixed in the vibrations, the amplitude of noises is much lower than the amplitude of vibrations of vocal cords. The ratio of amplitude of vibrations of vocal cord to the amplitude of noises is larger than the ratio of amplitude of voice to the amplitude of noise propagated through the air. The noises propagated through the bones are due to the movements at articulates and vibrations of tympanum, i.e., the tones produced through the musical instrument 11, by way of example. For this reason, the voice in the bone conduction is discriminative from the noises much clearly than the voice propagated through the air.

The signal propagation controller 133 includes a voice discriminating circuit 133*a*, a delay circuit 133*b* and a switch 133*c*. The bone conduction microphone 132 is connected to input node of the voice discriminating circuit 133*a*, and the voice discriminating circuit 133*a* is connected to the control node of the switch 133*c*. On the other hand, the close-talking microphone 131 is connected to the delay circuit 133*b*, and the delay circuit 133*b* is connected to the input node of the switch 133*c*. The output node of the switch 133*c* is connected to the transmitter module 13*b*.

The vibration signal S3 is supplied from the bone conduction microphone 132 to the voice discriminating circuit 133*a*, and the voice discriminating circuit 133*a* discriminates the vibrations of voice from the noises on the basis of the amplitude of the vibration signal S3, and produces a gate control signal S4. A delay time is introduced between the arrival of the vibration signal S3 to the output of the gate control signal S4. For this reason, the delay circuit 133*b* is connected between the close-talking microphone 131 and the switch 133*c*. The delay time introduced by the voice discriminating circuit 133*a* is equal to the delay time introduced by the voice discriminating circuit 133*a*. Even though the noises momentarily exceed a threshold range, even if the tutor 10 momentarily stops the voice, the voice discriminating circuit 133*a* ignores such abnormal situations. The delay time is calculated on the basis of the signal propagation characteristics of the voice discriminating circuit 133*a*. Otherwise, the delay time is experimentally determined.

While the tutor 10 is producing the voice, the voice discriminating circuit 133*a* keeps the gate control signal S4 active, and causes the switch 133*c* to be turned on. The voice signal S1 passes through the switch 133*c*, and arrives at the transmitter module 13*b*.

The transmitter module 13*b* includes an analog-to-digital converter and a suitable transmitter. The analog voice signal S1 is converted to the digital sound signal S2 through the analog-to-digital converter, and the transmitter puts the digital sound signal S2 on the communication channel. Although the communication channel for the pieces of music data and the communication channel for the pieces of voice data are established in the same communication network 30, a time delay, which is of the order of 10 millisecond to 100 millisecond, is unavoidably introduced between the arrival of pieces of music data and the arrival of pieces of voice data. If the tones produced through the musical instrument 11 are mixed in the voice signal S1, the trainee 20 feels the electric tones noisy. The signal propagation controller 133 does not permit the tones and environmental noise to reach the transmitter module 13*b*. Thus, the trainee hears only the tones produced through the musical instrument 21 by virtue of the signal propagation controller 133.

Figure 4:
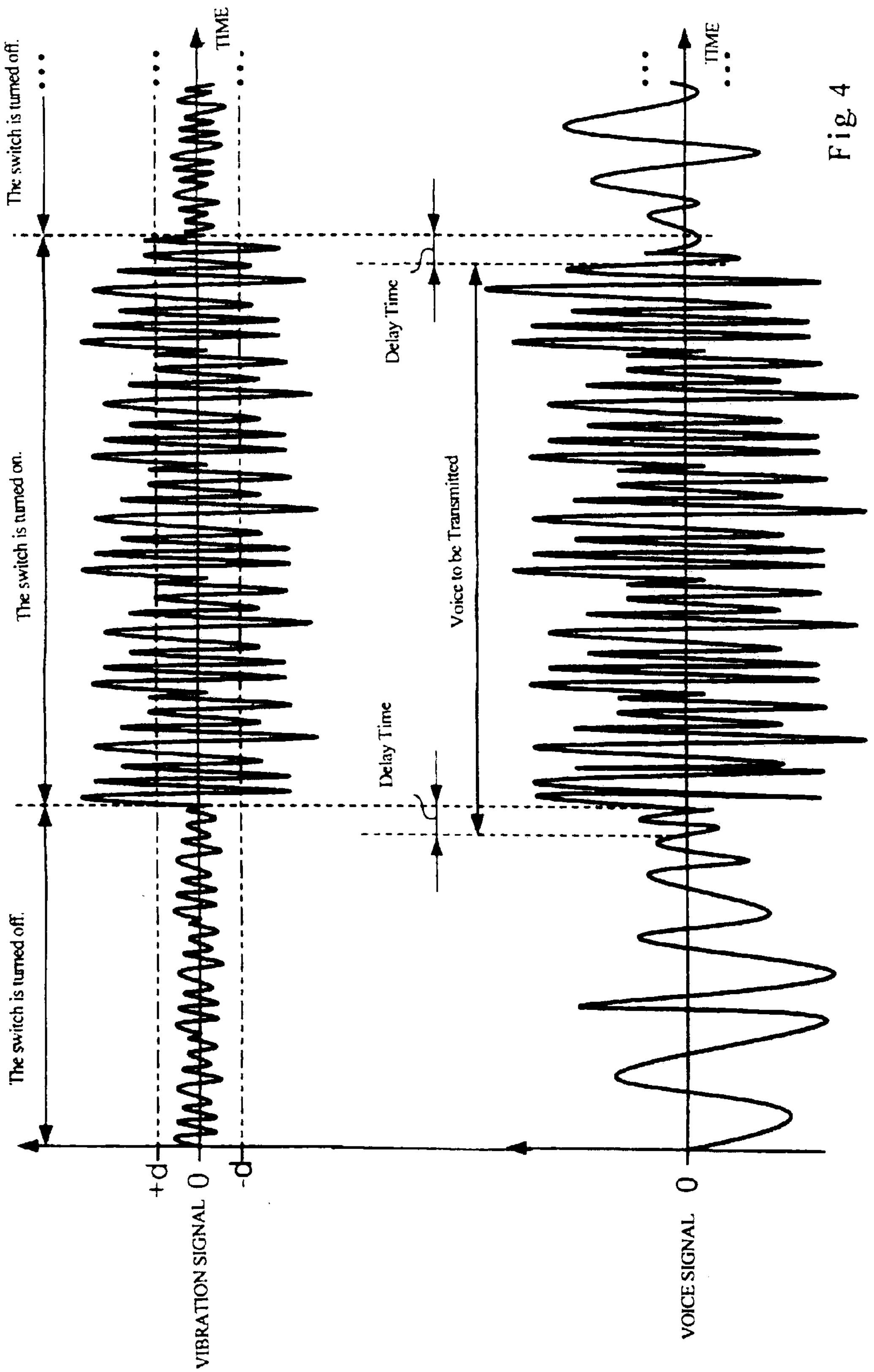
FIG. 4 is a graph showing the waveform of an electric signal output from the close-talking microphone and the waveform of another electric signal output from the bone conduction detector.

In this instance, the voice discriminating circuit 133*a* has a threshold range between +d and −d as shown in FIG. 4. While the amplitude of vibration signal S3 is being fallen within the threshold range ±d, the voice discriminating circuit 133*a* determines that the vibration signal S3 represents the noises, and keeps the gate control signal S4 at an inactive level. On the other hand, while the amplitude of vibration signal S3 frequently exceeds the thresholds ±d, the voice discriminating circuit 133*a* keeps the gate control signal S4 at an active level, and causes the switch 133*c* turned on. The threshold range ±d makes the amplitude of vibrations signal S3 propagated in the voice discriminating circuit 133*a* lower than the amplitude of vibration signal S3 before the arrival at the input node of the voice discriminating circuit 133*a* before the arrival at the input node of the voice discriminating circuit 133*a*.

As will be understood from the foregoing description, the signal propagation controller 133 analyzes the vibration signal S3 to see whether or not the tutor 10 starts to give the explanation to the trainee 20. While the tutor 10 is making the vocal cord vibrate, the vibration signals S3 frequently exceeds over the thresholds ±d, and the signal propagation controller 133 permits the voice signal S1 to reach the transmitter module 13*b*. However, while the tutor 10 is keeping himself or herself silent, the vibration signal S3 is swung within the threshold range ±d, and the signal propagation controller 133 makes the switch 133*c* turned off. As a result, the voice signal S1 is not transmitted from the music station 1 to the other music station 2. Although the close-talking microphone 131 picks up the tones of the musical instrument 11 during the exhibition performance, the signal propagation controller 133 prohibits the transmitter module 13*b* from the voice signal S1 representative of the tones in so far as the tutor 10 is silent. The tones in the exhibition performance are reproduced only through the musical instrument 21 at the music station 2 so that the trainee 20 can hear the exhibition performance without the electric tones radiated from the sound system 232.

Musical Instrument

Figure 5:
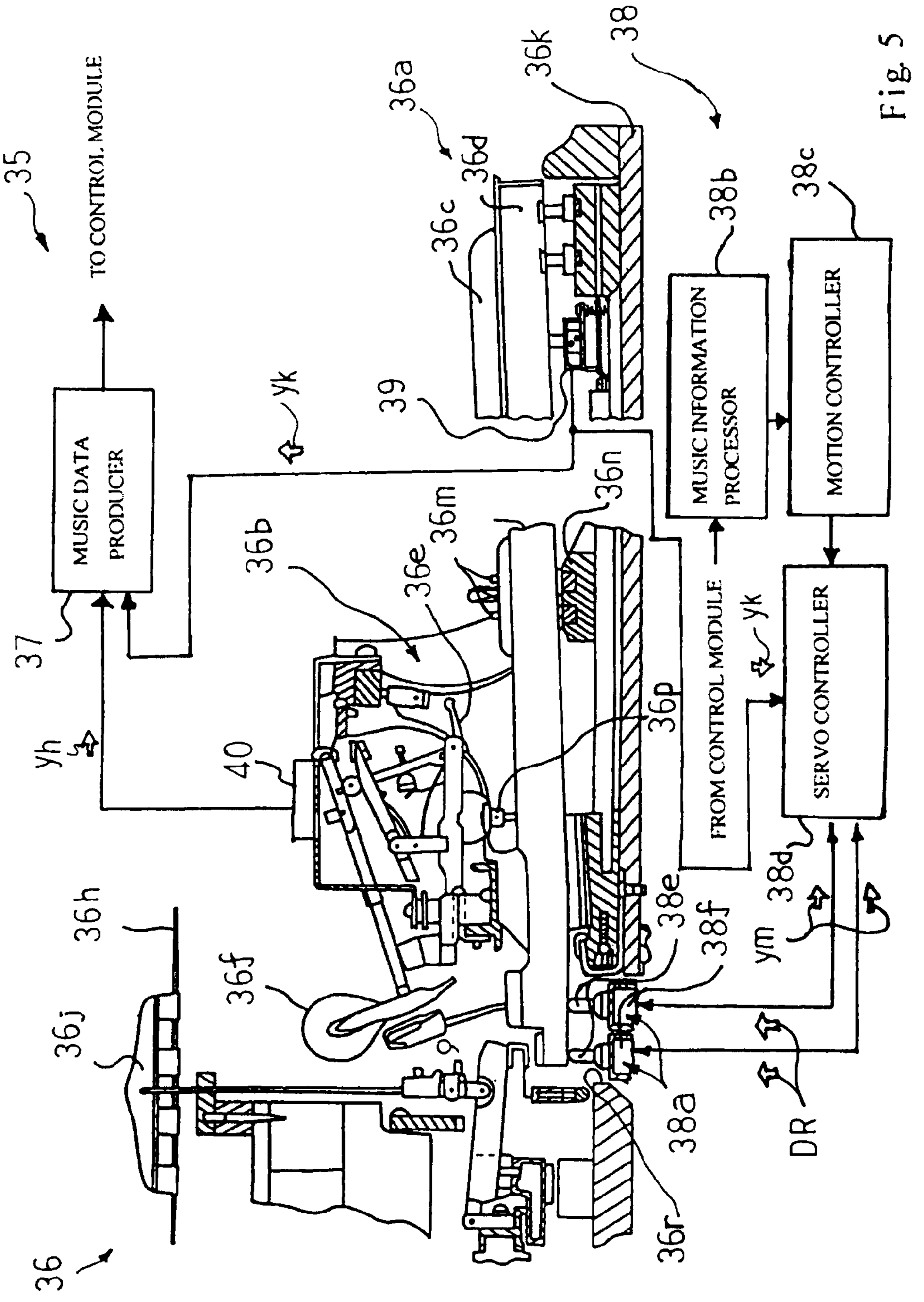
FIG. 5 is a schematic cross sectional view showing the structure of an automatic player piano available for the music performance system.

FIG. 5 shows the structure of an automatic player piano 35. The automatic player piano 35 is an example of the musical instrument 11 or 21. The automatic player piano 35 largely comprises an acoustic piano 36 and a music data producer 37/an automatic playing system 38. The acoustic piano 36 and music data producer 37 form in combination the musical instrument 11, and the acoustic piano 36 and automatic playing system 38 constitute the musical instrument 21. However, both of the music data producer 37 and automatic playing system 38 are illustrated in FIG. 5 together with the acoustic piano 36.

The tutor 10 fingers a piece of music on the acoustic piano 36, and acoustic piano tones are produced along the music passage in the acoustic piano 36. The automatic playing system 38 or music data producer 37 is installed in the acoustic piano 36. An original performance on the acoustic piano 36 is stored in a set of pieces of music data, and the automatic playing system 38 reenacts the performance on the acoustic piano 36 on the basis of the set of pieces of music data. The set of pieces of music data is produced through the music data producer 37. In this instance, the pieces of music data are coded in accordance with the MIDI protocols.

The acoustic piano 36 is broken down into a keyboard 36*a* and a tone generating system 36*b*. The keyboard includes black keys 36*c* and white keys 36*d*, and the tutor 10 selectively depresses and releases the black keys 36*c* and white keys 36*d* so as to specify the pitch of tones to be produced. The keyboard 36*a* is connected to the tone generating system 36*b*, and the tone generating system 36*b* produces the tones at the pitch specified through the keyboard 36*a*.

The tone generating system 36*b* includes action units 36*e*, hammers 36*f*, strings 36*h* and dampers 36*j*. An inner space is defined in the piano cabinet, and the action units 36*e*, hammers 36*f*, dampers 36*j* and strings 36*h* occupy the inner space. A key bed 36*k* forms a part of the piano cabinet, and the keyboard 36*a* is mounted on the key bed 36*k*. In this instance, the keyboard 36*a* has eighty-eight black and white keys 36*c*/36*d*.

The black keys 36*c* and white keys 36*d* are laid on the well-known pattern, and extend in parallel to a fore-and-aft direction of the acoustic piano 36. Pitch names are respectively assigned to the black keys 36*c* and white keys 36*d*. Balance key pins 36*m* offer fulcrums to the black keys 36*c* and white keys 36*d* on a balance rail 36*n*. Capstan buttons 36*p* are upright on the rear portions of the black keys 36*c* and the rear portions of the white keys 36*d*, and are held in contact with the action units 36*e*. Thus, the black keys 36*c* and white keys 36*d* are respectively linked with the action units 36*e* so as to actuate the action units 36*e* during travels from rest positions toward end positions. While any force is not being exerted on the front portions of black keys 36*c* and the front portions of white keys 36*d*, the weight of action units 36*e* are being exerted on the rear portions of black keys 36*c* and the rear portions of which keys 36*d*, and the black keys 36*c* and white keys 36*d* stay at the rest positions.

While a human player is depressing the front portions of black keys 36*c* and the front portions of white keys 36*d*, the front portions are sunk, and the black keys 36*c* and white keys 36*d* travel from the rest positions toward the end positions. In this instance, when the black keys 36*c* and white keys 36*d* are found at the rest positions, the keystroke is zero.

The action units 36*e* are provided in association with the hammers 36*f* and dampers 36*j*, and the actuated action units 36*e* drive the associated hammers 36*f* and dampers 36*j* for rotation.

The strings 36*h* are stretched inside the piano cabinet, and the hammers 36*f* are respectively opposed to the strings 36*h*. The dampers 36*j* are spaced from and brought into contact with the strings 36*h* depending upon the key position. While the black keys 36*c* and white keys 36*d* are staying at the rest positions, the dampers 36*j* are held in contact with the strings 36*h*, and the hammers 36*f* are spaced from the strings 36*h*.

When the black keys 36*c* and white keys 36*d* reach certain points on the way toward the end positions, the dampers 36*j* leave the strings 36*h*, and are spaced from the strings 36*h*. As a result, the dampers 36*j* permit the strings 36*h* to vibrate.

The action units 36*e* give rise to rotation of hammers 36*f* during the key movements toward the end positions, and escape from the associated hammers 36*f*. Then, the hammers 36*f* start the rotation, and are brought into collision with the associated strings 36*h* at the end of the rotation. The hammers 36*f* rebound on the associated strings 36*h*. Thus, the hammers 36*f* give rise to vibrations of the associated strings 36*h*. The acoustic piano tones are produced through the vibrations of the strings 36*h* at the pitch names identical with those assigned to the associated black and white keys 36*c*/36*d*.

When the tutor 10 releases the black keys 36*c* and white keys 36*d*, the black keys 36*c* and white keys 36*d* start to return toward the rest positions. The dampers 36*j* are brought into contact with the vibrating strings 36*h* on the way of keys 36*c*/36*d* toward the rest positions, and prohibit the strings 36*h* from the vibrations. As a result, the acoustic piano tones are decayed.

The automatic playing system 38 includes solenoid-operated key actuators 38*a* with built-in plunger sensors (not shown), a music information processor 38*b*, a motion controller 38*c*, a servo controller 38*d* and key sensors 39. The key sensors 39 are shared with the music data producer 37. The music information processor 38*b*, motion controller 38*c* and servo controller 38*d* stand for functions, which are realized through execution of a computer program.

A slot 36*r* is formed in the key bed 36*k* below the rear portions of the black and white keys 36*c* and 36*d*, and extends in the lateral direction. The solenoid-operated key actuators 38*a* are arrayed inside the slot 36*r*, and each of the solenoid-operated key actuators 38*a* has a plunger 38*e* and a solenoid 38*f*. The solenoids 38*f* are connected in parallel to the servo controller 38*d*, and are selectively energized with the driving signal DR so as to create respective magnetic fields. The plungers 38*e* are provided in the magnetic fields so that the magnetic force is exerted on the plungers 38*e*. The magnetic force causes the plungers 38*e* to project in the upward direction, and the rear portions of the black and white keys 36*c* and 36*d* are pushed with the plungers 38*e* of the associated solenoid-operated key actuators 38*a*. As a result, the black and white keys 36*c* and 36*d* pitch up and down without any fingering of a human player.

The built-in plunger sensors (not shown) respectively monitor the plungers 38*e*, and supply plunger velocity signals ym representative of plunger velocity to the servo controller 38*d*.

The key sensors 39 are provided below the front portions of the black and white keys 36*c*/36*d*, and monitor the black and white keys 36*c*/36*d*, respectively. In this instance, an optical position transducer is used as the key sensors 39. Plural light-emitting diodes, plural light-detecting diodes, optical fibers and sensor heads form in combination the array of key sensors 39. Each of the sensor heads is opposed to the adjacent sensor heads, and the black/white keys 36*c*/36*d* adjacent to one another are moved in gaps between the sensor heads. Light is propagated from the light-emitting diodes through the optical fibers to selected ones of sensor heads, and light beams are radiated from these sensor heads to the adjacent sensor heads. The light beams are fallen onto the adjacent sensor heads, and the incident light is propagated from the adjacent sensor heads to the light-detecting diodes. The incident light is converted to photo current. Since the black keys 36*c* and white keys 36*d* interrupt the light beams, the amount of incident light is varied depending upon the key positions. The photo current is converted to potential level through the light-detecting diodes so that the key sensors 39 output key position signals yk representative of the key positions. The key sensors yk have a detectable range as wide as or wider than the full keystroke, i.e., from the rest positions to the end positions. The key sensors 39 supply the key position signals yk representative of current key position of the associated black and white keys 36*c*/36*d* to the servo controller 38*d* and the music data producer 37. Pieces of position data, which express the current key positions, are used in the servo control sequence as will be hereinlater described. The pieces of position data are analyzed in the music data producer 37 for producing pieces of music data expressing a performance on the acoustic piano 36.

A performance is expressed by pieces of music data, and the pieces of music data are given to the music information processor 38*b* in the form of music data codes. In this instance, the pieces of music data are coded into music data codes in accordance with the MIDI protocols. For this reason, term "music data code" is hereinafter modified with "MIDI". A key movement toward the end position and a key movement toward the rest position are respectively referred to as a key-on event and a key-off event, and term "key event" means both of the key-on and key-off events.

The pieces of music data are sequentially supplied from the control module 21 to the music information processor 38*b*. A series of values of target key position forms a reference trajectory, and the target key position is varied with time. A reference point is found on the reference key trajectory. The hammer 36*f* is brought into collision with the associated string 36*h* at the target hammer velocity at the end of the rotation in so far as the associated black key 36*c* or associated white key 36*d* passes through the reference point.

MIDI music data codes, which express a performance, are supplied from the control module 21 to the music information processor 38*b*. The music information processor 38*b* firstly normalizes the pieces of music data, and converts the units used in the MIDI protocols to a system of units employed in the automatic player piano 35. In this instance, position, velocity and acceleration are expressed in millimeter-second system of units. Thus, pieces of playback data are produced from the pieces of music data through the music information processor 38*b*.

The motion controller 38*c* determines a reference key trajectory for each of the black keys 1*b* and white keys 1*c* to be depressed and released in the reproduction of a performance. In other words, the motion controller 38*c* produces pieces of reference key trajectory data on the basis of the pieces of playback data. As described hereinbefore, the reference key trajectory expresses at series of values of key position in terms of time. Therefore, the reference key trajectory indicates the time at which the black key 1*b* or white key 1*c* starts to travel thereon. The pieces of reference key trajectory data are supplied from the motion controller 38*c* to the servo controller 38*d*.

The servo controller 38*d* determines the amount of mean current of the driving signal DR. In this instance, the pulse width modulation is employed in the servo controller 38*d* so that the amount of mean current is varied with the time period in the active level of the driving signal. The servo controller 38*d* supplies the driving signal DR to the solenoid-operated actuator 38*a* associated with the black key 36*c* or white key 38*d* to be moved on the reference key trajectory, and forces the black key 36*c* or white key 36*d* to travel on the reference key trajectory through the pulse width modulation as follows.

While the black key 36*c* or white key 36*d* is traveling on the reference key trajectory, the built-in plunger sensor (not shown) and key sensor 39 supply the plunger velocity signal ym and key position signal yk to the servo controller 38*d*. The actual plunger velocity is approximately equal to the actual key velocity. The servo controller 38*d* calculates a value of target key velocity on the basis of a series of values of target key position, and compares the actual key position and actual key velocity with the target key position and target key velocity so as to determine a value of positional deviation and a value of velocity deviation. When the positional deviation and velocity deviation are found, the servo controller 38*d* increases or decreases the amount of mean current of the driving signal DR in order to minimize the positional deviation and velocity deviation. Thus, the servo controller 38*d* forms a feedback control loop together with the solenoid-operated key actuators 38*a*, built-in plunger sensors (not shown) and key sensors 39. The servo controller 38*d* repeats the servo control sequence, and forces the black keys 36*c* and white keys 36*d* to travel on the reference key trajectories.

The music data producer 37 is further connected to hammer sensors 40, and hammer position signals yh are supplied from the hammer sensors 40 to the music data producer 37. The music data producer 37 is realized through execution of a computer program.

The hammer sensors 40 monitor the hammers 37*f*, respectively, and supply the hammer position signals yh representative of pieces of hammer position data to the music data producer 37. In this instance, the optical position transducer is used as the hammer sensors 40, and is same as that used as the key sensors 39.

While the tutor 10 is giving an exhibition performance on the acoustic piano 36, the music data producer 37 periodically fetches the pieces of key position data and pieces of hammer position data, and analyzes the key movements and hammer movements on the basis of the pieces of key position data and pieces of hammer position data. The music data producer 37 determines key numbers assigned to the depressed keys 36*c*/36*d* and released keys 36*c*/36*d*, time at which the black keys 36*c* and white keys 36*d* start to travel toward the end positions, actual key velocity on the way toward the end positions, time at which the black keys 36*c* and white keys 36*d* start to return toward the rest positions, the key velocity on the way toward the rest positions, time at which the hammers 36*f* are brought into collision with the strings 36*h* and final hammer velocity immediately before the collision.

The music data producer 37 normalizes the pieces of key position data and pieces of hammer motion data, and produces MIDI music data codes from the pieces of key motion data and pieces of hammer motion data after the normalization. Both of the pieces of key motion data and pieces of hammer motion data are referred to as "pieces of performance data". The music data producer 37 eliminates individuality of the automatic player piano from the pieces of performance data through the normalization. The individualities of the automatic player piano are due to differences in sensor position, sensor characteristics and dimensions of component parts. Thus, the pieces of performance data of the automatic player piano are normalized into pieces of performance data of an ideal automatic player piano. The pieces of music data are produced from the pieces of performance data for the ideal automatic player piano, and are stored in the MIDI music data codes. The MIDI music data codes are supplied from the music data producer 37 to the control module 11.

Control Module

Figure 6:
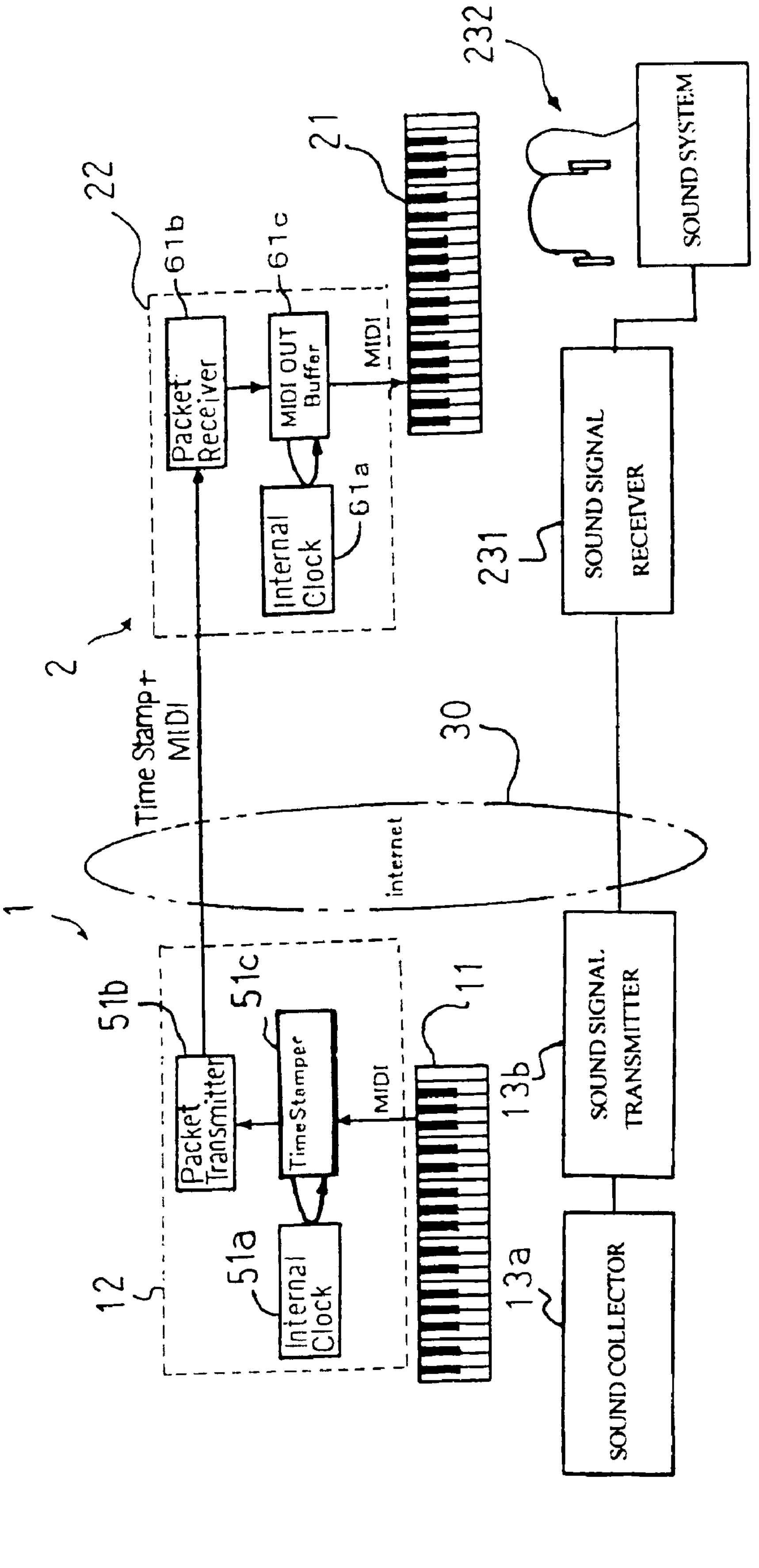
FIG. 6 is a block diagram showing the circuit configuration of the control modules of the music performance system.

FIG. 6 illustrates the control modules 12 and 22 connected through the communication channel in the communication network 30. The music data producer 37 of the musical instrument 11 is connected to the control module 12 so that the MIDI music data codes intermittently arrive at the control module 12. The control module 12 is connected through the communication channel of the communication network 30, i.e., the internet to the other control module 22. The MIDI music data codes transferred through the communication network 30 to the other control module 22, and arrive at the control module 22 at irregular intervals. The other control module 22 is connected to the music information processor 38*b* of the musical instrument 21, and the MIDI music data codes are supplied from the control module 22 to the music information processor 38*b* of the musical instrument 21.

The control module 12 includes an internal clock 51*a*, a packet transmitter module 51*b* and a time stamper 51*c*. The internal clock 51*a* measures a lapse of time, and the time stamper 51*c* checks the internal clock 51*a* to see what time the MIDI music data codes arrive thereat. When a MIDI music data code or MIDI music data codes arrive at the time stamper 51*c*, the time stamper 51*c* stamps the arrival time on the MIDI music data code or MIDI music data codes. The packet transmitter module 51*b* produces packets in which the MIDI music data codes and time codes are loaded, and delivers the packets to the communication network 30.

While the tutor 10 is performing the piece of music, the MIDI music data codes intermittently arrive at the time stamper 51*c*, and the time stamper 51*c* adds time data codes representative of the arrival times to the MIDI music data codes. The time stamper 51*c* supplies the MIDI music data codes together with the time data codes to the packet transmitter module 51*b*, and the packet transmitter module 51*b* transmits the packets to the slave audio-visual station 50*b* through the internet 10.

The controller 61 includes an internal clock 61*a*, a packet receiver module 61*h* and a MIDI out buffer 61*c*. The packet receiver module 61*b* unloads the MIDI music data codes and time data codes from the packets, and the MIDI music data codes are temporarily stored in the MIDI out buffer 61*c* together with the associated time data codes. The MIDI out buffer 61*c* periodically checks the internal clock 61*a* to see what MIDI music data codes are to be transferred to the musical instrument 21. When the time comes, the MIDI out buffer 61*c* delivers the MIDI music data code or codes to the musical instrument 21, and the music information processor 38*b*, motion controller 38*c* and servo controller 38*d* cooperate with one another for driving the solenoid-operated key actuators 38*a* as described hereinbefore in detail.

Signal Propagation Controller

Figure 7A:
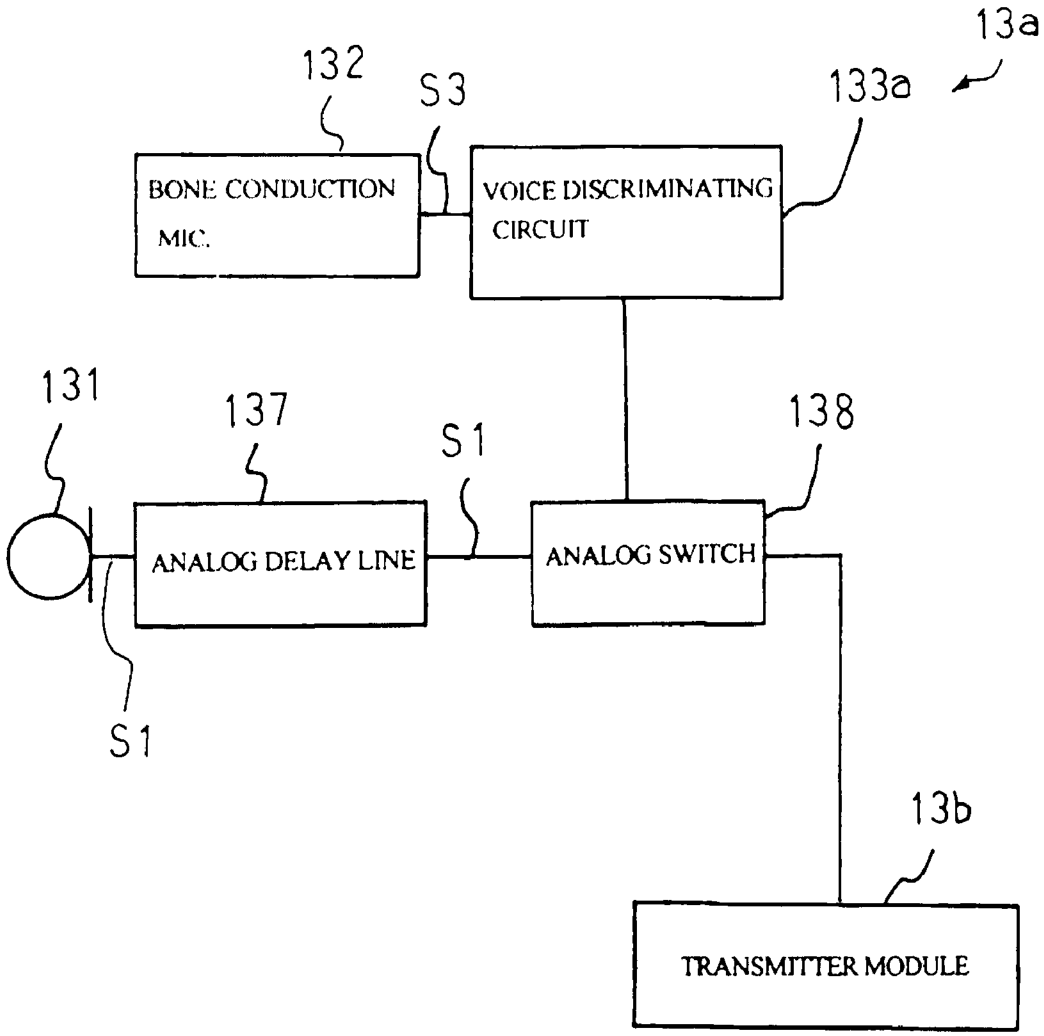
FIG. 7A is a block diagram showing the circuit configuration of a sound collector.

FIG. 7A shows an example of the circuit configuration of the signal propagation controller 133. In this instance, the delay circuit 133*b* and switch 133*c* are implemented by an analog delay line 137 and an analog switch 138, respectively. The analog delay line 137 introduces the predetermined delay time into the propagation of the voice signal S1. As described hereinbefore, the predetermined delay time is equal to the predetermined delay time introduced through the voice discriminating circuit 133*a*. While the voice discriminating circuit 133*a* is keeping the analog switch 138 in on state, the analog switch 138 exhibits extremely low resistance so that the voice signal S1 passes through the analog switch 138 without serious waveform distortion.

Figure 7B:
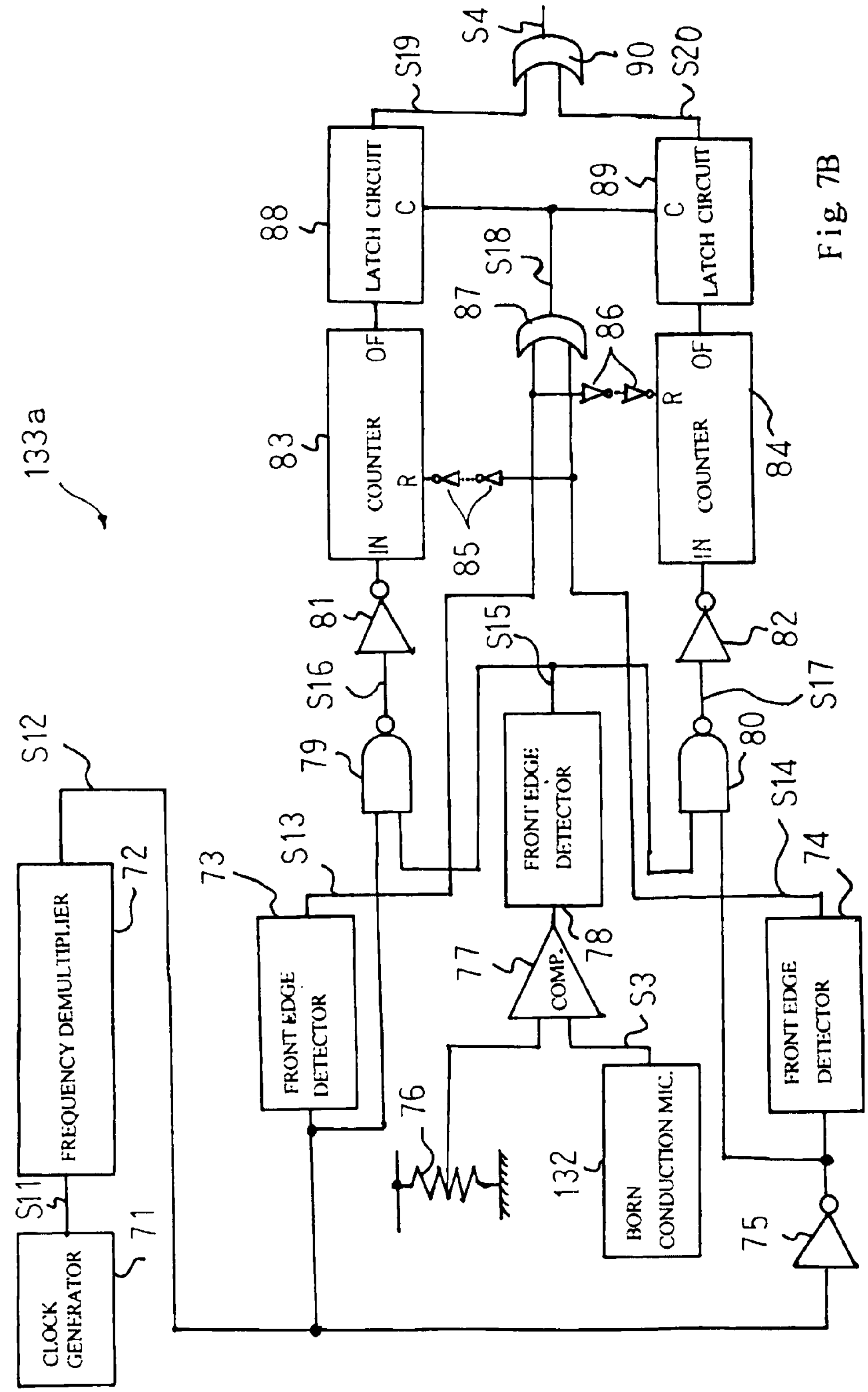
FIG. 7B is a block diagram showing the circuit configuration of a voice discriminating circuit.

The circuit configuration of the voice discriminating circuit 133*a* is illustrated in FIG. 7B. The voice discriminating circuit 133*a* includes a clock generator 71, a frequency demultiplier 72, front edge detectors 73 and 74 and an inverter 75. The output node of the clock generator 71 is connected to the input node of the frequency demultiplier 72, and the output node of the frequency demultiplier 72 is connected to the input node of the front edge detector 73 and the input node of the inverter 75. The output node of the inverter 75 is connected to the input node of the other front edge detector 74.

Figure 8A:
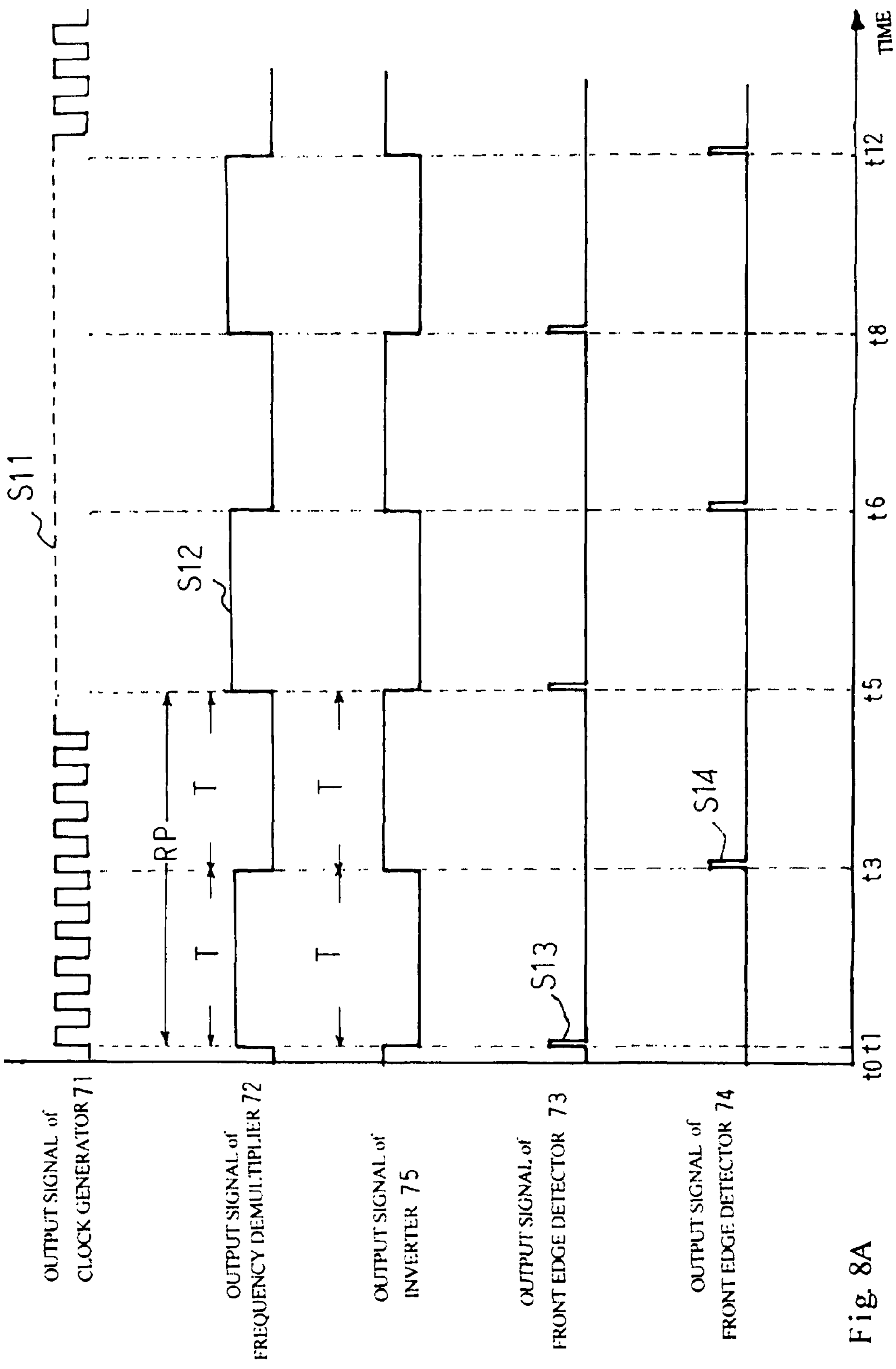
FIGS. 8A to 8D are timing charts showing the behavior of the sound collector.
Figure 8B:
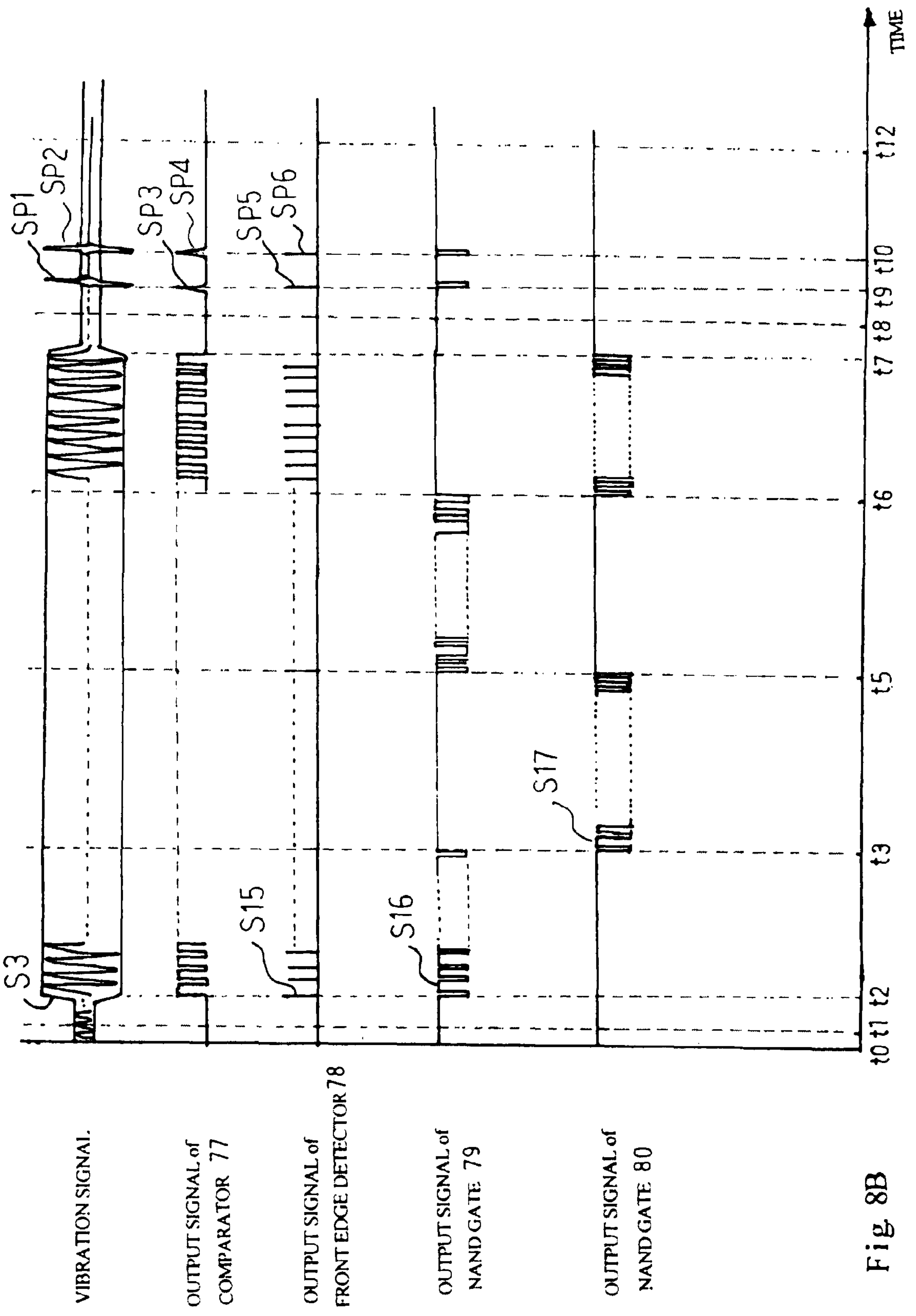
Figure 8C:
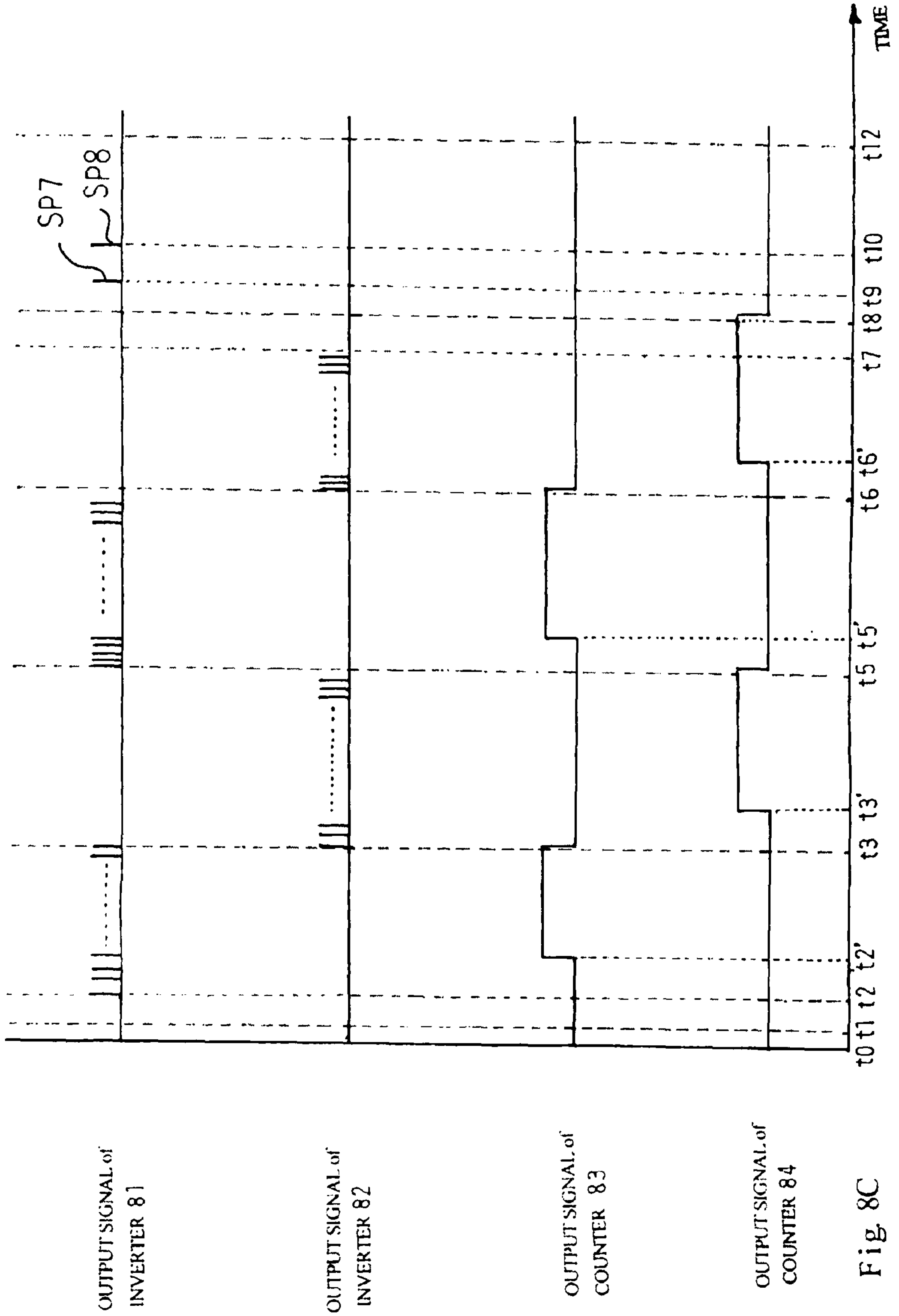
Figure 8D:
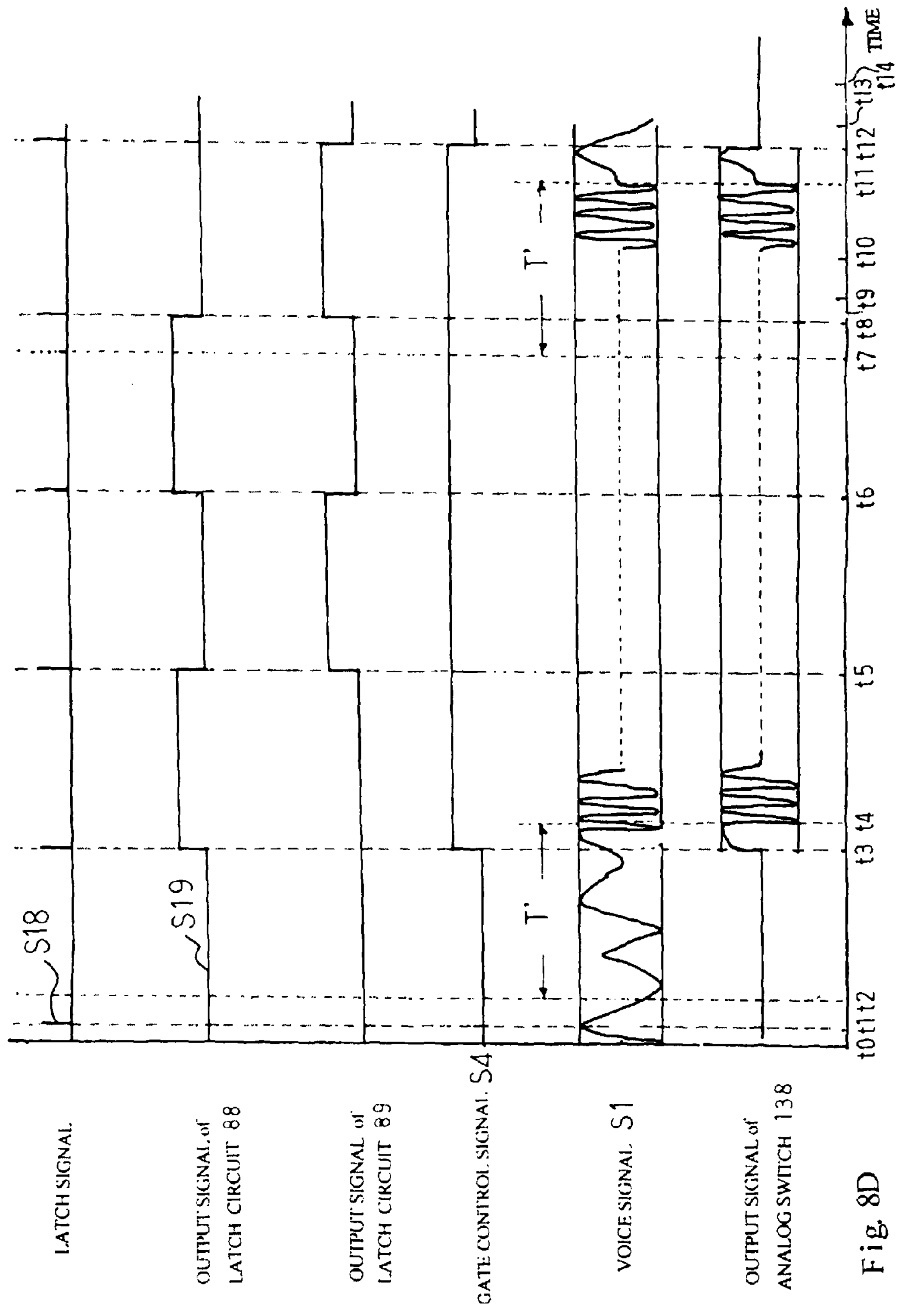

The clock generator 71 generates a clock signal S11, and the clock signal S11 is supplied to the frequency demultiplier 72. The frequency demultiplier 72 produces an output signal S12, the pulse period of which is much longer than the pulse period of the clock signal S11. A half of the pulse period of the output signal S12 is equal to the predetermined time period T (see FIG. 8A), and the vibration signal S3 is examined during the half of pulse period of the output signal S12 to see whether the vibrations are representative of voice or noises as will be hereinafter described in detail. The output signal S12 is directly supplied to the front edge detector 73, and is inverted before reaching the other front edge detector 74. Thus, the front edge detectors 73 and 74 alternately raise the output signals S13 and S14 at the starting time of the half of pulse period of the output signal S12, i.e. the predetermined time period T. Thus, the predetermined time period T is defined with the output signals S13 and S14 of the front edge detectors 73 and 74.

The voice discriminating circuit 133*a* further includes a level shifter 76, a voltage comparator 77 and a front edge detector 78. The output node of the level shifter 76 and the bone conduction microphone 132 are respectively connected to the input nodes of the voltage comparator 77, and the output node of the voltage comparator 77 is connected to the input node of the front edge detector 78. The level shifter 76 produces an output signal, the potential level of which is fixed to d. Therefore, the vibration signal S3 is compared with the potential level d by means of the voltage comparator 77. While the noises are being converted to the vibration signal S3, the potential level of vibration signal S3 is swung within the threshold range ±d, and the voltage comparator 77 keeps the output signal at the low level. On the other hand, while the voice is being converted to the vibration signal S3, the positive peaks exceed the threshold d, and the voltage comparator 77 keeps the output signal at the high level during the potential level over the threshold d. The front edge detector 78 raises the output signal at each time when the potential level exceeds the threshold d. Thus, the output signal S15 of the front edge detector 78 is indicative of the excess over the threshold d, and the frequency of output signal S15 is a half of the frequency of vibration signal S3 expressing the voice.

A level shifter, which produces an output signal of −d, another voltage comparator and another front edge detector may be provided in parallel to the level shifter 76, voltage comparator 77 and front edge detector 78. In this instance, the front edge detector is indicative of the excess over the threshold d, and another front edge detector is indicative of the delay under the threshold −d. The output signal of front edge detector 78 is ORed with the output signal of another front edge detector so that the output signal of OR gate is indicative of the frequency of the vibration signal expressing the voice.

The voice discriminating circuit 133*a* further includes NAND gates 79 and 80, inverters 81 and 82 and counters 83 and 84. Each of the NAND gates 79 and 80 has two input nodes. One of the two input nodes of the NAND gate 79 is connected to the output node of frequency demultiplier 72, and the other input node of the NAND gate 79 is connected to the output node of front edge detector 79. The frequency demultiplier 72 makes the NAND gate 79 enabled with the output signal S12 during every other predetermined time period T, and the enabled NAND gate 79 inverts the output signal S15 of the front edge detector 78. One of the input nodes of the other NAND gate 80 is connected to the output node of the inverter 75, and the other input node of NAND gate 80 is connected to the output node of the front edge detector 78.

The frequency demultiplier 72 makes the NAND gate 80 enabled with the complementary signal of the output signal S12 during the remaining predetermined time periods T, and enabled NAND gate 80 inverts the output signal S15 of the front edge detector 78. The output nodes of NAND gates 79 and 80 are respectively connected to the input nodes of the inverters 81 and 82, and the output nodes of inverters 81 and 82 are respectively connected to the input nodes IN of the counters 83 and 84. The output signals S16 and S17 are respectively inverted by means of the inverters 81 and 82 so that output signal S15 of front edge detector 78 is supplied to the input node IN of counter 83 during every other predetermined time period T from the output node of inverter 81 and to the input node IN of the other counter 84 during the remaining predetermined time periods T from the output node of inverter 82.

The counters 83 further have respective reset nodes R and respective overflow nodes OF. While the output signal S16 is repeatedly raised to the high level during every other predetermined time period T, the counter 83 is stepwise incremented with the output signal S16. When the counter 83 reaches a predetermined number, the counter 83 changes the overflow node OF to the high level. The counter 83 keeps the overflow node OF at the high level until the reset node R is changed to the high level. On the other hand, while the output signal S16 is repeatedly raised to the high level during the remaining predetermined time periods T, the counter 84 is stepwise incremented with the output signal S16. When the counter 84 reaches the predetermined number, the counter 84 changes the overflow node OF to the high level. The counter 84 keeps the overflow node OF at the high level until the reset node R is changed to the high level.

The predetermined time period T and predetermined number are determined in such a manner that the noises do not make the counters 83 and 84 change the overflow nodes OF to the high level. Even though large noise is produced at the articulates, the large noise does not make the counters 83 and 84 reach the predetermined number, and the overflow nodes OF are not changed to the high level. On the other hand, even if the tutor 10 becomes momentarily silent, the counters 83 and 84 keep the overflow nodes OF at the high level. Thus, the threshold range ±d, predetermined time period T and predetermined number are the important design parameters of the voice discriminating circuit 133*a*, and circuit designers determine these design parameters so as to discriminate the voice from the noises.

The voice discriminating circuit 133*a* further includes delay circuits 85 and 86, an OR gate 87, latch circuits 88 and 89 and an OR gate 90. The delay circuit 85 has an input node, which is connected to the output node of the front edge detector 74, and an output node connected to the reset node R of the counter 83. The input node of the other delay circuit 86 is connected to the output node of the front edge detector 73, and the output node of delay circuit 86 is connected to the reset node R of the counter 84. The OR gate 87 has two input nodes, which are connected to the output nodes of the front edge detectors 73 and 74, respectively. The output node of OR gate 87 is connected to the control nodes C of the latch circuits 88 and 89, and the overflow nodes OF of counters 83 and 84 are respectively connected to the input nodes of latch circuits 88 and 89. The output nodes of the latch circuits 88 and 89 are respectively connected to the input nodes of the OR gate 90, and the output node of OR gate 90 is connected to the control node of the analog switch 138.

As described hereinbefore, the front edge detectors 73 and 74 alternately changes the output signals S13 and S14 to the high level at the initiation of the predetermined time periods T. The output signal S13 is ORed with the output signal S14 so that the OR gate 87 changes a latch signal S18 to the high level at every initiation of the predetermined time period T. The latch signal S18 is supplied to the control nodes C of the latch circuits 88 and 89, and causes the latch circuits 88 and 89 to change the output nodes thereof to the potential level same as the potential level at the overflow nodes OF of the counters 83 and 84. Thus, the potential levels of overflow nodes OF are respectively latched by the latch circuits 88 and 89 at the initiation of every predetermined time period T. The output nodes of latch circuits 88 and 89 are connected to the input nodes of the OR gate 90 so that the output signals S19 of latch circuit 88 is ORed with the output signal S20 of the other latch circuit 89. The gate control signal S4 is supplied from the output node of the OR gate 90 to the control node of the analog switch 138.

Since the output signal S14 is supplied to the reset node R of the counter 83 through the delay circuit 85, the counter 83 is reset to zero at the initiation of the predetermined time period T next to the predetermined time period T for being incremented by the complementary signal of the output signal S16. On the other hand, the output signal S13 is supplied to the reset node R of the counter 84 through the delay circuit 86 so that the counter 84 is similarly reset to zero at the initiation of the predetermined time period T next to the predetermined time period T for being incremented by the complementary signal of the output signal S17. The delay circuits 85 and 86 make the potential levels at the overflow nodes OF surely latched by the latch circuits 88 and 89 before the reset operation on the counters 83 and 84.

In case where the vibration signal S3 exhibits the noises over several predetermined time periods T, both of the counters 83 and 84 keep the overflow nodes OF at the low level, and the low level is repeatedly latched by the associated latch circuits 88 and 89 at the initiation of every predetermined time period T, and the OR gate 90 keeps the gate control signal S4 at the inactive low level.

In case where the vibration signal S3 starts to express the voice in a certain predetermined time period T, there are two possibilities. The potential level of gate control signal S4 is dependent on the number found in the counter 83 or 84 at the end of the certain predetermined time period T.

First, the complementary signal of output signal S16 or S17 is assumed to cause the counter 83 or 84 to change the overflow node OF to the high level in the certain predetermined time period T, and the high level at the overflow node OF is latched by the associated latch circuit 88 or 89 at the initiation of the next predetermined time period T. As a result, the latch circuit 88 or 89 changes the output signal S19 or S20 to the high level, and, accordingly, the OR gate 90 changes the gate control signal S4 to the active high level.

Second, the counter 83 or 84 is assumed not to reach the predetermined number at the end of the certain predetermined time period T. In this situation, the counter 83 or 84 keeps the overflow node OF at the low level, and the associated latch circuit 88 or 89 supplies the low level to the OR gate 90. The other latch circuit 89 or 88 has supplied the low level to the OR gate 90. As a result, the OR gate 90 keeps the gate control signal S4 at the inactive low level. The complementary signal of output signal S16 or S17 makes the counter 83 or 84 change the overflow node OF to the high level in the next predetermined time period T, and the associated latch circuit 88 or 89 causes the OR gate 90 to change the gate control signal S4 to the active high level when the control enters the new predetermined time period T.

In case where the vibration signal S3 expresses the voice over several predetermined time periods T, the counters 83 and 84 alternately change the overflow nodes to the high level, and the high level at the overflow nodes OF is alternately latched by the associated latch circuits 88 and 89. Although the counters 83 and 84 are reset to zero immediately after the latching operations, the latch circuits 88 and 89 keep the high level after the reset operations, and the OR gate 90 keeps the gate control signal S4 at the active high level.

In case where the tutor 10 stops the pronunciation in a certain predetermined time period T, there is also two possibilities. The complementary signal of output signal S16 or S17 has already made the counter 83 or 84 reach the predetermined number, or has not made the counter 83 or 84 reach the predetermined number, yet.

If the counter 83 or 84 has reached the predetermined number, the overflow node OF is found to be the high level. The high level at the overflow node OF is latched by the latch circuit 88 or 89, and the OR gate 90 keeps the gate control signal S4 at the active high level until the end of the certain predetermined time period T.

On the other hand, if the counter 83 or 84 does not reach the predetermined number, the counter 83 or 84 keeps the overflow node OF at the low level, and the low level at the overflow node OF is latched at the end of the certain predetermined time period T. The other counter 84 or 83 was reset to zero immediately after the entry into the certain predetermined time period T, and the low level at the overflow node OF is latched by the other latch circuit 89 or 88. For this reason, both of the input nodes of OR gate 90 are found to be low. As a result, the OR gate 90 changes the gate control signal S4 to the inactive low level.

FIGS. 8A to 8D shows the behavior of the sound collector 13*a*, and t0, t1, t2, t2', t3, t3', t4, t5, t5', t6, t6', t7, t8, t9, t10, t11, t12, t13 and t14 are particular time on the time axis.

When the sound collector 13*a* is powered on, the clock generator 71 produces the output signal S11, the waveform of which is a square pulse train. The clock generator 71 supplies the output signal S11 to the frequency demultiplier 72, and the frequency demultiplier 72 produces the output signal S12, the pulse period RP of which is a predetermined times longer than the pulse period of the clock signal S11. The output signal S12 is supplied to the inverter 75 so that the inverter 75 outputs the complementary signal of output signal S12. The output signal S12 rises to the high level for the predetermined time period T, and the complementary signal of output signal S12 also rises to the high level for the predetermined time period T. However, the complementary signal is different in phase from the output signal S12 by 180 degrees. The output signal S12 rises to the high level at time t1, time t5, time t8 . . . , and the complementary signal rises to the high level at time t3, time t6, time t12 . . . .

When the output signal S12 rises to the high level, the front edge detector 73 momentarily changes the output signal S13 to the high level. For this reason, the output signal S13 raises the potential level thereof to the high level at time t1, time t5, time t8, . . . . The other front edge detector 73 momentarily changes the output signal S14 at the pulse rise of the complementary signal so that the output signal S14 raises the potential level to the high level at time t3, t6, t12 . . . . . Thus, the front edge detectors 73 and 74 alternately change the initiation of predetermined time period T. The output signals S13 and S14 of front edge detectors 73 and 74 are used for the latch operation and the delayed signals of output signals S13 and S14 are used for the resetting operation as will be described hereinlater in detail.

The tutor 10 starts the vocal explanation at time t2. Although the vibration signal S3 expresses the noises at time t1, the voice of tutor 10 causes the vibration signal S3 to express the voice from time t2, and the vibration signal S3 is swung over and below the threshold range ±d. The pronunciation is continued from time t2 to time t7. The noises is assumed to make the vibration signal S3 swung over and below the threshold range ±d at time t9 and time t10. For this reason, spikes SP1 and SP2 takes place at time t9 and time t10.

While the vibration signal S3 is being swung over and below the threshold range ±d, the voltage comparator 77 repeatedly changes the output signal to the high level so that a pulse train is output from the voltage comparator 77 between time t2 and time t7. The spikes SP1 and SP2 cause the voltage comparator 77 to produce a spike SP3 and Spike SP4. The pulse train is supplied to the front edge detector 78, and the front edge detector 78 momentarily raises the output signal S15 to the high level at all of the front edges of the pulse train. The spikes SP3 and SP4 cause the front edge detector 78 to produce pulses SP5 and Spike SP6 at time t9 and time t10. The output signal S15 is supplied from the front edge detector 78 to the NAND gates 79 and 80 from time t2 to a time immediately before time t7.

The NAND gate 79 is enabled with the output signal S12 in every other predetermined time periods T stating at time t1, time t5, time t8, and the other NAND gate 80 is enabled with the complementary signal of the output signal S12 in the remaining predetermined time periods T starting at time t3, time t6, time t12, . . . . For this reason, the output signal S15 is NANDed with the output signal S12, and the NAND gate 79 starts to decay the output signal S16 at time t2 and the output signal S16 is swung from time t2 to time t3 and from time t5 to time t6. The pulses SP5 and SP6 make the output signal S16 to decay the potential level at time t9 and time t10. On the other hand, the output signal S15 is NANDed with the complementary signal of output signal S12, and the NAND gate 80 repeatedly decays the output signal S17 from time t3 to time t5 and from time t6 to time t7.

The output signal S16 is supplied from the NAND gate 79 to the inverter 81, and the complementary signal of output signal S16 is supplied from the inverter 81 to the input node IN of the counter 83 between time t2 and time t3 and between time t5 and time t6. The noise causes the inverter 81 to produce the pulses SP7 and SP8 at time t9 and time t10, and the pulses SP7 and SP8 are also supplied to the input node IN of the counter 83.

Similarly, the output signal S17 is supplied from the NAND gate 80 to the inverter 82, and the complementary signal of output signal S17 is supplied from the inverter 82 to the input node IN of the counter 84 between time t3 and time t5 and between time t6 and time t7.

The complementary signal of output signal S16 makes the counter 83 incremented, and the counter 83 reaches the predetermined number at time t2' in the predetermined time period T between time t1 and time t3 and at time t5' in the predetermined time period T between time t5 and time t6. The output signal S14 is supplied to the delay circuit 85 at time t3, time t6, time t12 . . . so that the delay circuit 85 makes the counter 83 reset to zero immediately after time t3, time t6, time t12, . . . . For this reason, the counter 83 changes the overflow node OF to the high level at time t2' and time t5', and the overflow node OF is recovered to zero immediately after time t3, time t6. However, the pulses SP7 and SP8 does not cause the counter 83 to reach the predetermined number in the predetermined time period T between time t8 and time t12. For this reason, the counter 83 keeps the overflow node OF at the low level in the predetermined time period T between time t8 and time t12.

The complementary signal of output signal S17 makes the counter 84 incremented, and the counter 84 reaches the predetermined number at time t3' in the predetermined time period T between time t3 and tine t5 and at time t6' in the predetermined time period T between time t6 and time t8. For this reason, the counter 84 changes the overflow node OF to the high level at time t3' and time t6'. Since the output signal S13 is supplied to the delay circuit 86 at time t1, time t5, time t8, . . . , the delay circuit 86 makes the counter 84 reset to zero immediately after time t5 and time t8.

The output signal S13 is ORed with the output signal S14, and, accordingly, the OR gate 87 changes the latch signal S18 to the high level at time t1, time t3, time t5, time t6, time t8, time t12 . . . . The latch signal S18 causes the latch circuits 88 and 89 to take the potential level at the overflow nodes OF thereinto. Since the delay circuits 85 and 86 prevent the counters 83 and 84 from incomplete latch operation, the potential level at the overflow nodes OF are surely relayed to the associated latch circuits 88 and 89 at the initiation of predetermined time periods T.

The potential level at the overflow node OF of counter 83 is found to be at the low level, high level, low level, high level, low level and low level at time t1, time t3, time t5, time t6 time t8 time t12, respectively. For this reason, the latch circuit 88 raises the output signal S19 to the high level between time t3 and time t5 and between time t6 and time t8, and keeps the output signal S19 at the low level in the remaining predetermined time periods T.

The potential level at the overflow node OF of counter 84 is found to be at the low level, low level, high level, low level, high level and low level at time t1, time t3, time t5, time t6, time t8, time t12, respectively. For this reason, the latch circuit 89 raises the output signal S20 to the high level between time t5 and time t6 and between time t8 and time t12, and keeps the output signal S20 at the low level in the remaining predetermined time periods T.

The output signal S19 is ORed with the output signal S20 so that the OR gates 90 changes the gate control signal S4 to the high level between time t3 and time t12. The gate control signal S4 is supplied from the OR gate 90 to the analog switch 138.

The voice signal S1 starts to express the voice of tutor 10 from time t2 to time t7, and the analog delay line 137 introduces the delay time T', which is equal to the predetermined time period T, into the propagation of the voice signal S1. For this reason, the voice signal S1, which expresses the voice reaches the analog switch 138 at time t4, and is terminated at time t11. Since the gate control signal S4 raises the potential level at time t3, and is decayed at time t12, the voice signal S1 passes through the analog switch 138 between time t3 and time t12. Although the voice signal S1 between time t3 and time t4 and between time t11 and time t12 expresses the noise as similar to the vibration signal S3 between time t1 and time t2 and between time t7 and time t8, the noise is continued for an extremely short time period, and the trainee 20 ignores the noise. The noise at time t9 and time t10 reaches the analog switch 138 at time t13 and time t14. The analog switch 138 has turned off before reaching the noise. For this reason, the noise at time t9 and time t10 does not reach the trainee 20. Similarly, the tones in the exhibition performance do not reach the tutor 20 in so far as the tutor 10 keeps himself or herself silent. Thus, the trainee 20 can concentrate himself or herself to the tones reproduced through the musical instrument 21 without disturbance of the electric tones.

As will be appreciated from the foregoing description, the sound collector 13*a* of the present invention has the two microphones 131 and 132. One 132 of the two microphones serves as a detector for the vibrations of vocal cords, and the other microphone 131 converts the sound waves to the voice signal S1. Although the noises are also propagated through the air to the other microphone 131, the signal propagation controller 133 permits the voice signal S1 to pass therethrough during the detection of the vibrations of vocal cord. As a result, the noise is eliminated from the voice signal S1.

The sound signal transmitter of the present invention has the transmitter module 13*b*, which is connected to the sound collector 13*a*. Since the sound collector 13*a* prohibits the transmitter module 13*b* from the noise, the sound signal expressing the voice is transmitted from the transmitter module 13*b*.

The music performance system of the present invention has the music station 1 on which the sound signal transmitter is provided together with the musical instrument 11. While the tutor 10 is giving an exhibition performance on the musical instrument 11, the control module 12 transmits the pieces of music data through the communication channel to the other music station 2, and the automatic playing system reproduces the exhibition performance on the musical instrument 21 for the trainee 20. Although the microphone 131 converts the tones produced through the musical instrument 11 to the voice signal S1, the voice signal expressing the tones does not reach the transmitter module 13*b* so that the trainee hears the exhibition performance only through the musical instrument 21. Thus, the music performance system of the present invention prevents the trainee 20 from the noisy electric tones.

The tutor 10 may pronounce during the exhibition performance. In this situation, the pronunciation is converted to the voice signal together with the tones, and the pronunciation and tones are transmitted to the music station 2 in parallel to the pieces of music data. The automatic player 38 reproduces the tones through the musical instrument 21, and the pronunciation and tones are converted to the voice and tones through the sound system 232. However, the tutor 10 usually gives the explanation before and/or after the exhibition performance. In other words, the parallel transmission is exceptional. For this reason, the music performance system of the present invention makes the trainee 20 carefully listen to the exhibition performance.

Although the particular embodiment of the present invention has been shown and described, it will be apparent to those skilled in the art that various changes and modifications may be made without departing from the spirit and scope of the present invention.

The musical instrument 11, control module 12 and sound transmitter 13 may have a unitary structure. For example, the control module 13 and sound transmitter 13 may be installed inside a cabinet of the musical instrument 11. Similarly, the control module 22 and receiver module 23 may be installed inside the musical instrument 21.

The internet does not set any limit to the technical scope of the present invention. The music stations 1 and 2 may be connected to each other through a LAN (Local Area Network).

The close-talking microphone 131 does not set any limit to the technical scope of the present invention. A non-directional microphone may be used for collecting environmental sound.

The bone conduction microphone may be held in contact with the cutis on the cranium, chin or cheekbone. It is possible to use a murmur microphone instead of the bone conduction microphone. The murmur microphone converts the vibration propagated through human flesh to an electric signal.

The music performance system is available for a remote concert. A player performs music tunes on the musical instrument 11, and the pieces of music data are transmitted from the music station 1 to the other music station 2 through the communication channel. The automatic player 38 reproduces the music tunes through the musical instrument 21. The player talks to the audience on and around the other music station 2 about the music tunes, and the sound collector 13*a* converts the talk to the voice signal, and the voice signal is transmitted through the communication channel to the other music station 2. The talk is radiated from the sound system 232. The signal propagation controller 133 does not permit the voice signal expressing the tones to reach the transmitter module 13*b*. For this reason, the performances are reproduced only through the musical instrument 21, and the audience enjoys them.

Two players may enjoy an ensemble through the music performance system of the present invention. The remote lesson may be concurrently given to plural trainees.

The sound collector 13*a* may be connected to a recorder instead of the transmitter module. In this instance, the sound collector 13*a* permits the player to talk without interruption of the recording.

The automatic player pianos 11 and 21 do not set any limit to the technical scope of the present invention. There are various sorts of hybrid musical instruments equipped with automatic players. A stringed musical instrument is combined with an automatic player, and a hybrid wind musical instrument has an automatic player. An automatic drum set is known. The automatic player piano 11/21 may be replaced with another sort of hybrid musical instruments.

Moreover, the automatic player pianos 11 and 21 may be replaced with electronic musical instruments such as, for example, electronic keyboards and electronic wind musical instruments. The electronic musical instruments produce the electronic tones through the tone generators on the basis of the music data codes.

The delay circuit 133*b* may be removed from the signal propagation controller 133 if the delay time is ignorable.

Although the voice signal discriminator 133*a* is implemented by wired logic circuits in FIG. 7B, it is possible to implement the functions of voice signal discriminator 133*a* through a computer program. In this instance, an information processor, sampling circuit and a current driver are required, and the computer program is stored in a suitable memory such as, for example, a CD-ROM (Compact Disk Read Only Memory). While the computer program is running on the information processor, the following tasks are achieved. The vibration signal S3 are sampled and converted to discrete values at regular time intervals, and the discrete values are periodically fetched by the information processor. The information processor accumulates the discrete values, and checks the discrete values to see whether the vibration signal S3 expresses the noise or vibrations of chord. The vibration signal S3 expressing the vibrations of the vocal cords has the amplitude wider than the threshold range ±d, and the excess over the threshold is continued for a certain time period. When the information processor finds the vibrations of the vocal cords, the information processor requests the current driver to supply the gate control signal at the active high level to the control node of the analog switch 138. On the other hand, if the vibration signal S3 expresses the noise, the information processor requests the current driver to keep the gate control signal at the inactive low level.

The vocal cord does not set any limit to the technical scope of the present invention. The bone conduction microphone may be adhered to a body of a stringed musical instrument. While a player is bowing a music tune on the stringed musical instrument, the signal propagation controller permits the transmitter module to transmit the sound signal from a non-directional microphone to another music station. However, the signal propagation controller stops the sound signal after the performance. As a result, the environmental noises do not reach the transmitter module.

Figure 9:
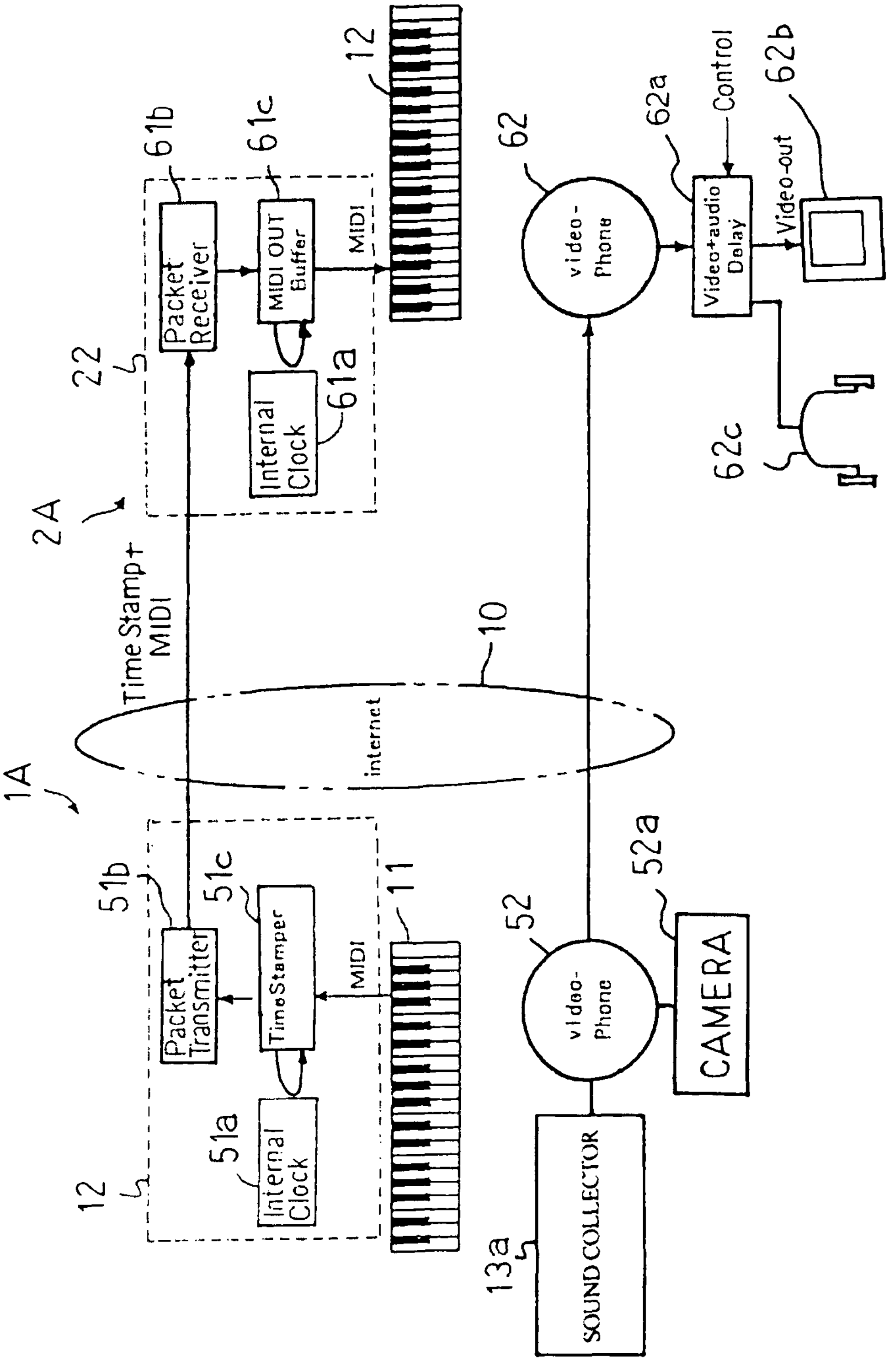
FIG. 9 is a block diagram showing another music performance system of the present invention.

Moving visual images may be further transmitted from a music station 1A occupied by the tutor 10 to another music station 2A occupied by the trainee 20 as shown in FIG. 9. In this instance, the transmitter module 13*b* and receiver module 231 are replaced with video-phones 52 and 62, respectively. The sound collector 13*a* and camera 52*a* are connected in parallel to the video-phone 52, and the video-phone 62 is connected to a delay circuit 62*a*, which in turn is connected in parallel to a video display 62*b* and a headphone 62*c*. A transmitter module is incorporated in the video-phone 52, and a receiver module is incorporated in the video-phone 62. The pieces of voice data and pieces of visual data are transmitted from the transmitter module through the communication channel to the receiver module, and are converted to voice and visual images through the headphone 62*c* and video display 62*b*.

Figure 10:
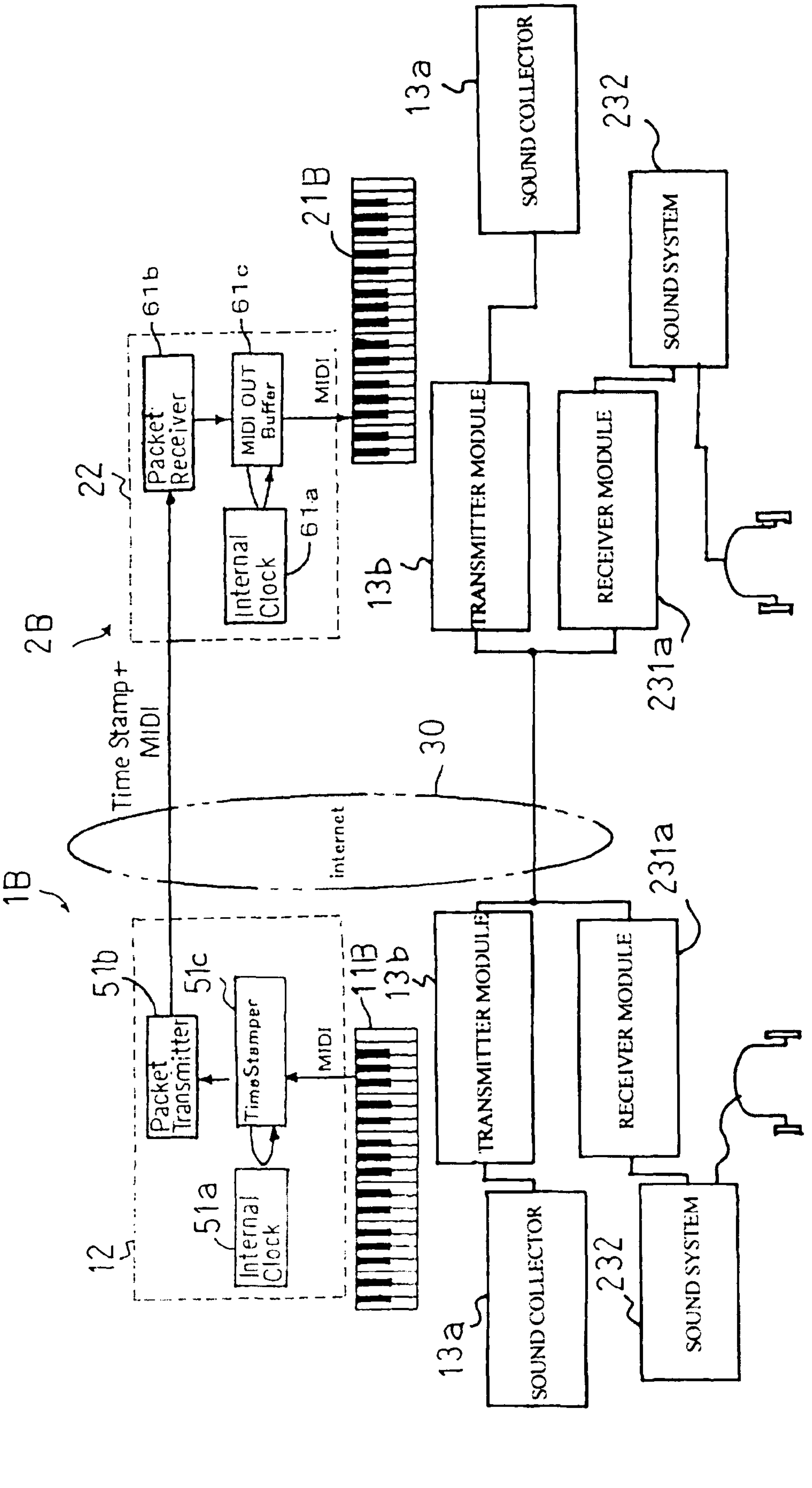
FIG. 10 is a block diagram showing yet another music performance system of the present invention.

Although the embodiments shown in FIGS. 6 and 9 transmits the pieces of voice data from tutor's music station 1/1A to trainee's music station 2/2A, yet another music performance system shown in FIG. 10 bi-directionally transmits the pieces of music data and pieces of voice data between music stations 1B and 2B. A transmitter module 13*b* and a receiver module 231*a* are incorporated in each of the music stations 1B and 2B, and the sound collectors 13*a* and sound systems 232 are respectively connected to the transmitter modules 13*b* and receiver modules 231*a*. Thus, the pieces of voice data are transmitted between the music stations 1B and 2B. In order to give the music data producing capability and automatic playing capability, each of the musical instruments 11B and 21B includes the acoustic piano 36, music data producer 37 and automatic playing system 38.

The component parts of the electric acoustic stringed musical instrument shown in the figures are correlated with claim languages as follows.

The voice signal S1 is corresponding to a "sound signal", and the vocal cord serves as a "source of sound". The bone conduction microphone 132 serves as a "vibration detector", and the bones and cutis as a whole constitute a "vibration propagating medium". The close-talking microphone 131 is corresponding to a "microphone", and the signal propagation controller 133 is also referred to as a "signal propagation controller" in the claims. The tutor 10 is a "living being". The voice discriminating circuit 133*a* serves as a "target sound discriminating circuit". The gate control signal S4 is corresponding to a "control signal", and the articulates, tympanum and musical instrument 11 are "other sources".

The transmitter module 13*b* is corresponding to a "transmitter" in the claims.

The musical instrument 11/21 and control module 12 are also referred to a "musical instrument" and a "control module" in the claims, and the communication channels serve as a "communication channel". The black keys 36*c* and white keys 36*d* serve as "plural manipulators", and the automatic playing system 38 has a "tone generating capability". The tone generating system 36*b* is referred to as a "tone generator" in the claims. The key sensors 39, hammer sensors 40 and music data producer as a whole constitute a "music data generating system".

What is claimed is:

1. A microphone system comprising:

a microphone adapted to receive airborne sounds, a vibration detector adapted to receive vibrations propagated through a medium other than air, and a controller adapted to un-mute the microphone on detection of vibrations by the vibration detector, wherein the controller is adapted to un-mute said microphone if a signal strength of the detected vibrations exceeds a predetermined threshold.

2. A system according to claim 1, wherein the controller comprises an on/off switch to respectively un-mute and mute said microphone.

3. A system according to claim 1, wherein the controller is adapted to mute said microphone if a signal strength of the detected vibrations falls below a predetermined threshold.

4. A system according to claim 1, the controller is adapted to un-mute said microphone with a predetermine delay time if a signal strength of the detected vibrations exceeds a predetermined threshold.

5. A system according to claim 3, wherein the controller is adapted to mute said microphone with a predetermined delay time if a signal strength of the detected vibrations falls below a predetermined threshold.

* * * * *